United States Patent [19]
Eguchi et al.

[11] Patent Number: 5,239,417
[45] Date of Patent: Aug. 24, 1993

[54] LENS BARREL FOR AUTOMATIC FOCUSING CAMERA

[75] Inventors: Haruki Eguchi, Tokyo; Takuji Hamasaki, Saitama; Kenji Watanabe; Katsumori Kikuchi, both of Tokyo; Hiroaki Suzuki, Kanagawa; Morio Takizawa; Atsushi Matsuda, both of Saitama, all of Japan

[73] Assignee: Asahi Kogaku Kogyo Kabushiki Kaisha, Tokyo, Japan

[21] Appl. No.: 885,839

[22] Filed: May 20, 1992

[30] Foreign Application Priority Data

| May 21, 1991 | [JP] | Japan | 3-218139 |
| May 21, 1991 | [JP] | Japan | 3-218142 |
| May 21, 1991 | [JP] | Japan | 3-218143 |
| May 21, 1991 | [JP] | Japan | 3-218144 |
| Oct. 22, 1991 | [JP] | Japan | 3-337497 |
| Apr. 27, 1992 | [JP] | Japan | 4-027524 |
| Apr. 27, 1992 | [JP] | Japan | 4-027525 |

[51] Int. Cl.⁵ .................................... G02B 7/02
[52] U.S. Cl. .................................... 359/823; 359/698; 359/702; 354/400; 354/195.13
[58] Field of Search ............ 359/693, 694, 695, 696, 359/697, 698, 699, 700, 701, 702, 705, 823; 354/400, 195.12, 195.13

[56] References Cited

U.S. PATENT DOCUMENTS

| 3,834,796 | 9/1974 | Komine | 359/697 |
| 4,002,405 | 1/1977 | Stahl | 359/697 |
| 4,456,356 | 6/1984 | Okabe | 354/195.13 |
| 4,461,545 | 7/1984 | Yokotsuka | 359/702 |
| 4,720,182 | 1/1988 | Imanari | 359/705 |
| 4,890,132 | 12/1989 | Hama | 354/400 |
| 4,893,145 | 1/1990 | Matsuda | 354/400 |
| 5,115,348 | 5/1992 | Notagashira | 359/697 |

FOREIGN PATENT DOCUMENTS

2242034 9/1991 United Kingdom.

Primary Examiner—Loha Ben
Attorney, Agent, or Firm—Sandler Greenblum & Bernstein

[57] ABSTRACT

A lens barrel for an automatic focusing camera is provided with an annular changeover member arranged so as to be manually rotatable about the optical axis, and further arranged so as to be manually movable in a direction of the optical axis. A first clutch mechanism is provided for releasing a connection between the annular changeover member and an annular focusing member, to permit independent rotation thereof, when the annular changeover member is in an AF mode setting position, and for forming the connection therebetween to thereby form a rotationally dependent structure when it is in an MF mode setting position. A second clutch mechanism is provided for forming a connection between a drive shaft and the annular focusing member when the annular changeover member is in the AF mode setting position, and for releasing the connection therebetween when it is in the MF mode setting position.

27 Claims, 38 Drawing Sheets

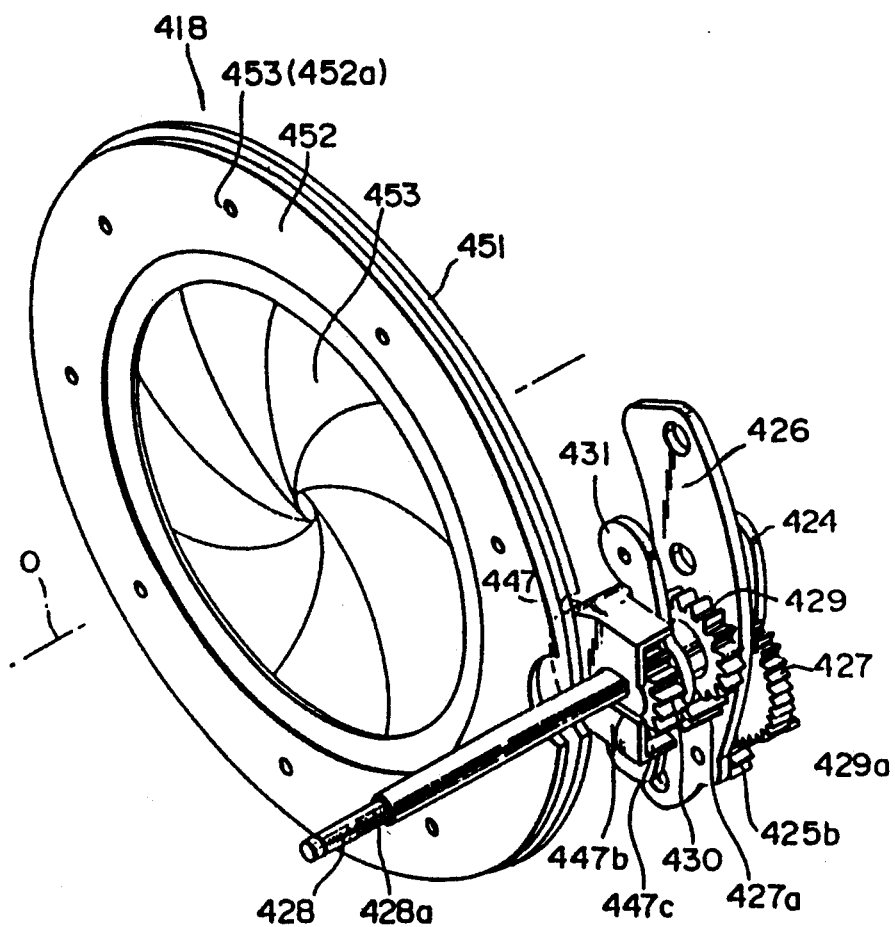
F I G. 51

LENS BARREL FOR AUTOMATIC FOCUSING CAMERA

BACKGROUND OF THE INVENTION

1. Field of the Invention

The present invention relates to a lens barrel for an AF single-lens reflex camera.

In an AF single-lens reflex camera, it has been in practice heretofore to effect a change between manual focusing (MF) and automatic focusing (AF) by an operation with a changeover switch provided at the side of the camera body. To describe this in detail, the conventional single-lens reflex camera is provided with an AF driving shaft which is rotated by a motor in the camera body while an interchangeable lens is provided with an AF driven shaft, which is driven by this AF driving shaft. The AF mode is defined by the state in which these two AF shafts, namely the AF driving shaft and the AF driven shaft, are interconnected. In this AF mode, the rotation of the AF driving shaft drives the AF driven shaft for its rotation. The focusing lens group is moved in the directional of the optical axis in accordance with the rotating motion of this AF driven shaft, and a focusing operation is thereby performed. Further, the focusing ring at the side of the lens is rotated at the same time as this movement.

The setting of the changeover from this AF mode to the MF mode is executed by cutting off the connection between the AF driving shaft positioned on the body side and the AF driven shaft provided on the lens. In this MF mode, the focusing ring on the lens, is rotated by the photographer's manual operation. Along with the rotation of this focusing ring, the focusing lens group is moved in the direction of the optical axis and performs a focusing operation.

This conventional lens barrel has its focusing ring moved in rotation even at a time when the AF mode is set. For this reason, consideration is given in such a way that the focusing ring will not interfere with the photographer's operation in the course of the AF operation, with such contrivances as making the focusing ring itself in a small size (that is, making the focusing ring in a narrow width) and arranging the focusing ring at the distal end part of the lens barrel. However, it has been pointed out as a problem, that a focusing ring made in a small size and arranged at the top end part of the lens barrel will on the contrary make it more difficult for the photographer to perform a manual operation on the focusing ring at the time when the camera is set in the MF mode. Also, as described above, the changeover switch for switching between the AF mode and the MF mode is provided on the side of the camera body, and it has therefore been pointed out as a problem, that it is hard to operate this changeover switch.

SUMMARY OF THE INVENTION

The present invention has been made in view of the problems mentioned above. A primary object of the present invention is to offer a lens barrel for an automatic focusing camera wherein the lens barrel is constructed in such a manner as to be capable of allowing the photographer to perform an operation for a changeover between the MF mode and the AF mode on the side of the lens and thereby attaining improvements on the ease and efficiency of this mode-changing operation.

Moreover, another object of the present invention is to propose a construction of a focusing ring which permits a manual operation thereof when the MF mode is set, and will not rotate at the time when the AF mode is set, thereby offering a lens barrel that is easy and convenient for use with an automatic focusing camera.

The present invention is provided with an AF-MF changeover ring, which can be rotatably operated allowing the lens barrel to have linear forward and backward movement along a line in the direction of its optical axis. Then, the lens barrel for an automatic focusing camera, according to the present invention, has a generic feature. When the AF-MF changeover ring is in the MF position, the lens barrel for an automatic focusing camera ring allows the photographer to operate the camera by a manual focusing operation with the rotation of this AF-MF changeover ring. When the ring is in the AF position, which is closer to the other end part along a line in the direction of the optical axis, the lens barrel, provided with this AF-MF changeover ring, enables the photographer to work with the camera in an automatic focusing operation without the trouble of rotating the AF-MF changeover ring.

In order to resolve the problems mentioned above and to attain the objects of the present invention, the lens barrel for an automatic focusing camera, in one aspect of embodiment of the present invention, is provided with an annular focusing member for moving a focusing lens in a direction of the optical axis by rotating the annular focusing member about an optical axis and an automatic focusing device for rotating the annular focusing member by a driving force applied by a motor. The lens barrel further includes an annular changeover member arranged so as to be manually rotatable about the optical axis and arranged so as to be manually movable in the direction of the optical axis between an AF mode setting position and an MF mode setting position. The lens barrel includes clutching devices wherein a first clutch releases a connection between the annular changeover member and the annular focusing member to permit independent rotation thereof when the annular changeover member is in the AF mode setting position and for forming a connection therebetween to thereby form a rotationally dependent structure when the annular changeover member is in the MF mode setting position. A second clutch is formed connecting the automatic focusing device and annular focusing member when the annular changeover member is in the AF mode setting position and for releasing the connection when the annular changeover member is in the MF mode setting position.

The lens barrel formed in this construction, in accordance with the present invention, is capable of performing the changeover operations between the MF mode and the AF mode by operations on the lens side and also preventing the focusing ring from rotating when the AF mode is set, while permitting a manual operation when the MF mode is set, thereby achieving improvements on the case and efficiency in the changeover operations and offering a lens barrel that is easy and convenient for use with an automatic focusing camera.

Furthermore, the lens barrel, in another aspect of embodiment of the present invention, is provided further with a locking device which permits the rotation of the AF-MF changeover ring and locks it respectively in correspondence with the AF position and the MF position of the AF-MF changeover ring. The lens barrel, thus provided further with the locking device, is capable of preventing the AF-MF changeover ring from rotating by accident at the time the AF operation is set.

BRIEF DESCRIPTION OF THE DRAWINGS

The manner by which the above-mentioned objects, features and advantages of the present invention are attained will be fully evident from the following detailed description when it is considered in light of the drawings, wherein:

FIG. 51 is a perspective view illustrating the construction of the main parts including the diaphragm block.

DETAILED DESCRIPTION OF THE PREFERRED EMBODIMENTS

Figure 1:
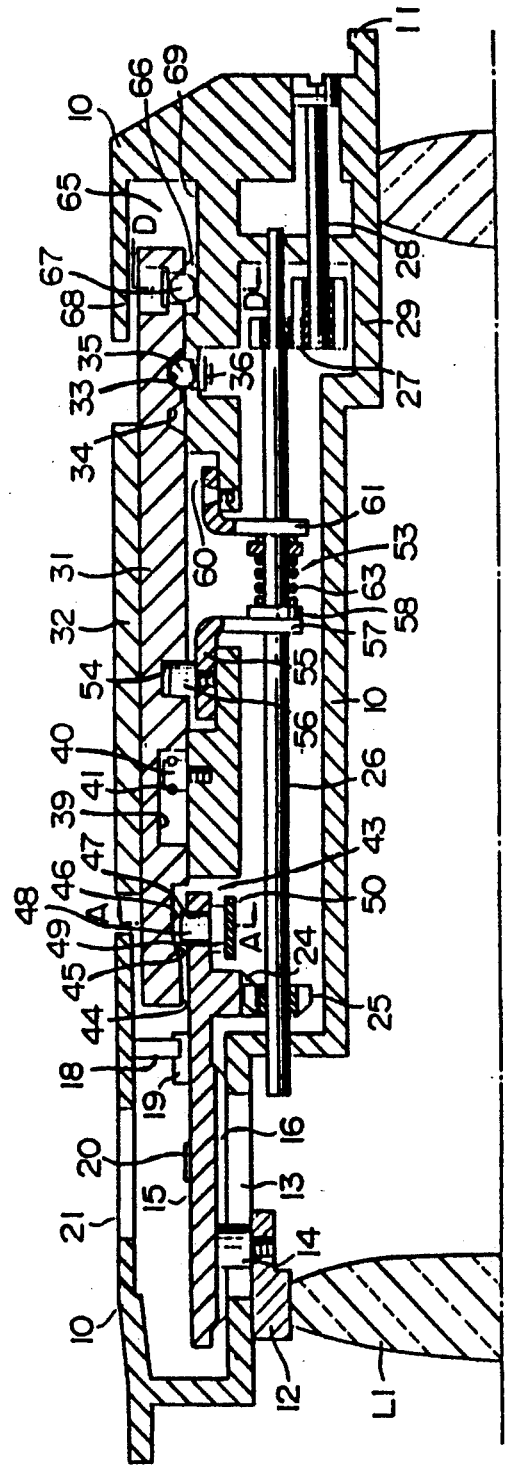
FIG. 1 is an upper-half vertical sectional view showing the state of the AF mode set in the lens barrel which has been constructed, for use with an automatic focusing camera, as described in the first example of a preferred embodiment of the present invention.

Now, with reference to the accompanying drawings, a detailed description will be made of the construction of each of the various examples of preferred embodiment as applied to a lens barrel, according to the present invention, for use with an automatic focusing camera.

First, the construction of a lens barrel in a first example of a preferred embodiment of the present invention, as applied to its use with an automatic focusing camera, will be described in detail with reference to FIG. 1 through FIG. 9.

The lens barrel in the first example of a preferred embodiment is provided, at its rear end part, with a stationary ring 10 having a lens mount 11 with which the lens barrel is to be mounted on a camera body. In the front area, on the inner circumference of this stationary ring 10, a focusing lens frame 12, which supports a focusing lens L1, is fitted in such a manner as to move freely along a line in the direction of the optical axis. This stationary ring 10, which is actually comprised of a plural number of ring-shaped members arranged in their combination, is formed in a state in which each of the members is fixed with the other members. Therefore, the stationary ring 10 is depicted, for the sake of convenience in illustration, as though it were a single member.

On this stationary ring 10, a linear movement guide groove 13, which extends along a line in the direction of the optical axis, is formed in the state of its penetration through the stationary ring 10 in the direction of its thickness. This linear movement guide groove 13 is fitted with a guide pin 14 which is fixed on the outer circumferential surface of the focusing lens frame 12. In this linear movement guide groove 13, a focusing ring 15, which is in a state of being fixed on the outer circumference of the focusing lens frame 12, is fitted. The focusing ring 15, in a state of being positioned on the outer circumference of the linear movement guide groove 13 in this focusing lens frame 12, is set, in such a manner as to be capable of rotating freely round the optical axis, in the stationary ring 10. A leading groove 16, which accepts a guide pin 14 into itself, is formed on the inner circumferential surface of the focusing ring 15. Accordingly, as the focusing ring 15 rotates round the optical axis, the focusing lens frame 12 (with the focusing lens L1 set therein) moves along a line in the direction of the optical axis, following the linear movement guide groove 13, the leading groove 16, and the guide pin 14, and thus a focusing operation is performed. The rotating range of the focusing ring 15 is regulated by the engagement between a pair of stopping projections 18, which are provided on the stationary ring 10, and stopping projections 19, which are provided on the focusing ring 15. Moreover, a calibrated photographing distance scale 20 is arranged on the outer circumferential surface of the focusing ring 15. The photographing distance scale 20 is viewed through an observation window 21, formed in the stationary ring 10.

In the rear part of the inner circumferential surface of the focusing ring 15, an internal gear 24 is formed coaxially. In the meantime, the stationary ring 10 supports an AF transmission shaft 26, coaxially having a first pinion 25, which, being fixed thereto, engages itself with the internal gear 24, in such a manner that the AF transmission shaft 26 is permitted to move along a line in the direction of the optical axis, and also to rotate freely round its own central axial line. On the rear end part of the AF transmission shaft 26, a second pinion 27 is coaxially held in a rigid state. The second pinion 27 meshes with a third pinion 29, which is formed coaxially in an integrated structure with the AF driven shaft 28, which is set up in parallel with the AF transmission shaft 26. The AF driven shaft 28 will be connected with an AF driving shaft (not shown in the drawings) provided inside a camera body when the lens barrel is mounted, as generally known, on the camera body, which is not illustrated in the drawings. The rotation of the AF driven shaft 28 is transmitted to the focusing ring 15 via the gear trains 27, 29, and 25, mentioned above.

Figure 2:
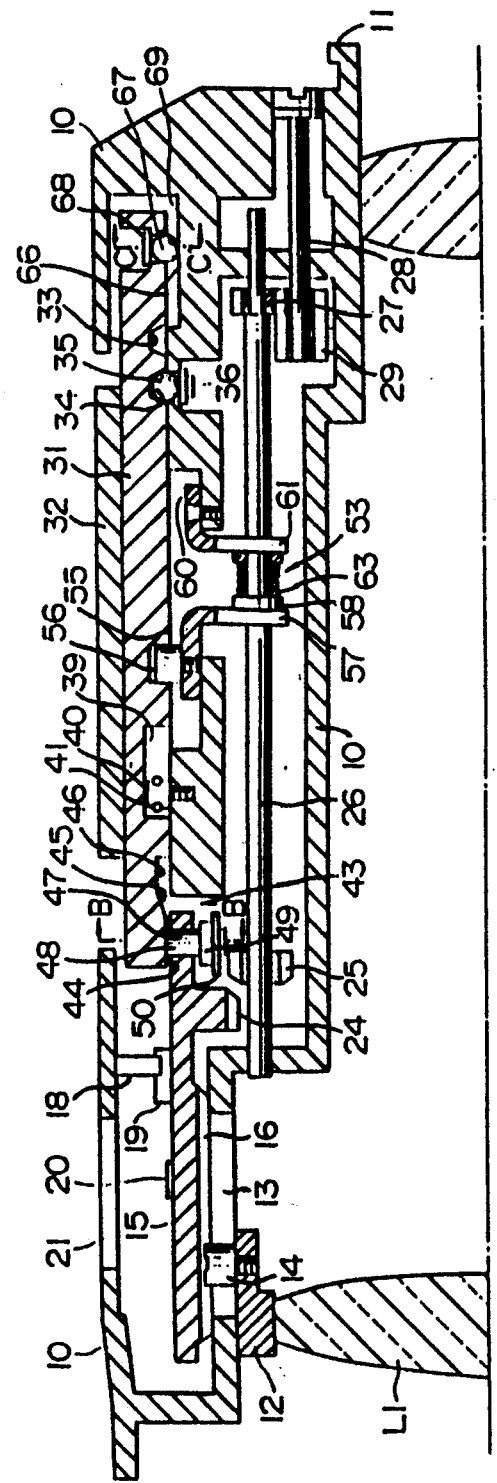
FIG. 2 is an upper-half vertical sectional view illustrating the state of the MF mode of the lens barrel which has been constructed, for use with an automatic focusing camera, as described in the first example of a preferred embodiment of the present invention.

The stationary ring 10 is provided with an AF-MF changeover ring 31 as fitted in the intermediate part thereof, in the longitudinal direction, in such a manner as to enable the AF-MF changeover ring 31 to move linearly along a line in the direction of the optical axis and to rotate freely round the optical axis. A decorative facing ring 32 is placed for a finish on the outer circumference of the AF-MF changeover ring 31. In the first example of preferred embodiment, the AF mode is set in the state of the AF-MF changeover ring 31 as moved to the end point for its forward movement along a line in the direction of the optical axis (as shown in FIG. 1). The MF mode is set in the state of the AF-MF changeover ring 31 as moved to the end point for its backward movement along a line in the direction of the optical axis (as shown in FIG. 2). In other words, this AF-MF changeover ring 31 is supported in such a way as to be able to move along a line in the direction of the optical axis between the AF position, in which the AF mode is to be set, and the MF position, in which the MF mode is to be set.

On the inner circumferential surface of the rear part of the AF-MF changeover ring 31, annular V-shaped grooves 33 and 34 are formed respectively in their correspondence with the AF position and the MF position just mentioned. The stationary ring 10 is provided with a click ball 35, which fits into either one of these annular V-shaped grooves 33 and 34, and a plate spring 36, which applies its pressing force working outwardly in the direction of the radius to the click ball 35. Moreover, the AF-MF changeover ring 31 is provided, on its inner circumferential surface, with a moving range regulating groove 39, which limits the ranges of movements of the AF-MF changeover ring 31, itself, in the direction of the optical axis. In the meantime, the stationary ring 10 is provided with a position regulating pin 40 fixed thereon and positioned inside this moving range regulating groove 39 and getting into its direct contact with the regulating walls respectively located in the forward area and rearward area in the moving range regulating groove 39. The position regulating pin 40 is fitted with an elastic ring (O-ring) 41 for use as a buffer at the time when the position regulating pin 40 collides with the regulating walls respectively located in the forward and rearward areas in the moving range regulating groove 39.

A first clutch mechanism 43 is provided between the AF-MF changeover ring 31 and the focusing ring 15. The first clutch mechanism 43 enables the focusing ring 15 to rotate freely in relation to the AF-MF changeover ring 31 when the AF-AF changeover ring 31 is in the AF position in the forward area. The focusing ring 15 and the AF-MF changeover ring 31 are set into a unified structure with respect to the direction of their rotation, when the AF-MF changeover ring 31 is in the MF position in the rearward area. In further detail, the first clutch mechanism 43 is provided with a smaller diameter part (engaging part) 44, a tapered diameter part (transition part) 45, and a larger diameter part (nonengaging part) 46. The parts are formed in the stated order, starting with the forward position, in the direction of the optical axis, with the parts of the first clutch mechanism facing the inner surface of the circumference of the forward part of the AF-MF changeover ring 31. In the meantime, a clutch pin hole 47, penetrating along a line in the direction of the radius, is formed on the focusing ring 15.

Figure 3:
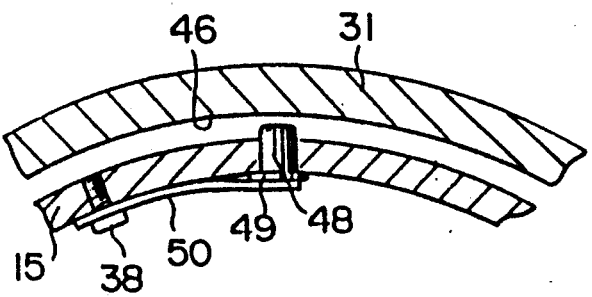
FIG. 3 is a sectional view illustrating the first clutch mechanism as taken along the line A—A when it is in a state set in the AF mode, as shown in FIG. 1.
Figure 4:
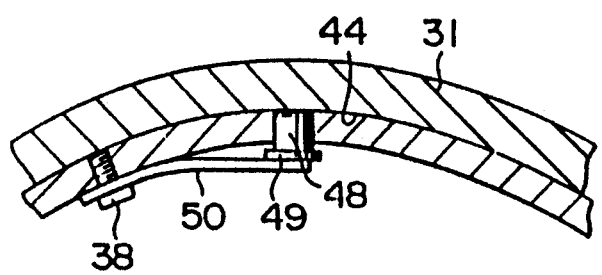
FIG. 4 is a sectional view illustrating the first clutch mechanism as taken along the line B—B when it is in a state set in the MF mode, as shown in FIG. 2.
Figure 5:
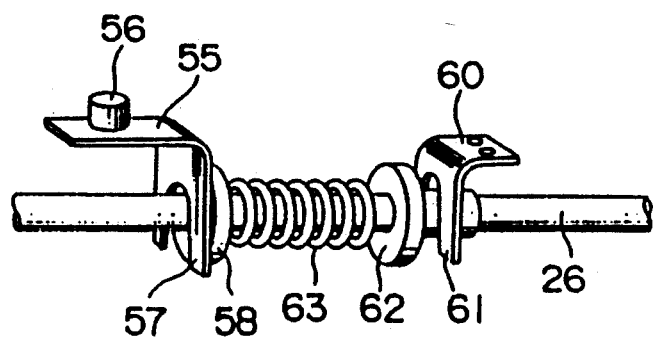
FIG. 5 is a perspective view illustrating an example of a mechanism which applies force to the AF transmission shaft in the lens barrel, as shown in FIG. 1.

In this clutch pin hole 47, a clutch pin 48 is set in a manner permitting its free sliding motion along a line in the direction of the radius, so that the clutch pin 48 may be put in a position in which it faces the smaller diameter part 44, the tapered diameter part 45, or the larger diameter part 46. This clutch pin 48 has its end part protruding outward in the direction of the radius, restricted by the engagement of the fall-off preventing head part 49, with the inner circumferential surface of the focusing ring 15 and the clutch pin 48 being thrust outward in the direction of the radius by the plate spring 50. In this regard, the clutch pin 48 is set so that it will have its top part separated from the inner circumferential surface of the larger diameter part 46, as shown in FIG. 3, while its fall-off preventing head part 49 is set in an engagement with the inner circumferential surface of the focusing ring 15. In this state, the top end part of the clutch pin 48 is set in a manner permitting its direct contact with the inner circumferential surface of the smaller diameter part 44. As a result, the fall-off preventing head part 49 will be separated inwardly in the direction of the radius from the inner circumferential surface of the focusing ring 15, while the top end part of the clutch pin 48 is in direct contact with the inner circumferential surface of the smaller diameter part 44, as shown in FIG. 4.

Figure 6:
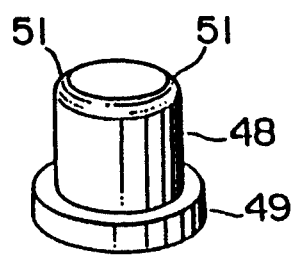
FIG. 6 is a perspective view illustrating the focusing clutch pin as taken out of the construction of the lens barrel.

In this regard, a plate spring 50 is fixed by an end part thereof on the inner circumferential surface of the focusing ring 15, by means of a fixing screw 38, as shown in FIG. 3. Also, the clutch pin 48, which receives pressing force exerted by a plate spring 50, as shown in FIG. 6 with a single unit configuration in an isolated state, is formed into such a tapered shape as the periphery on the outer circumference at the top end thereof. This will form, for example, a contact area 51, in a prescribed width over an entire circumference, in order that the force of friction for the frictional engagement between the top end part of the clutch pin 48 and the smaller diameter part 44 of the AF-MF changeover ring 31 can be set at a large value.

That is to say, the first clutch mechanism 43 is constructed in such a manner that the top end of the clutch pin 48 is positioned, in a state of being separated at a prescribed distance therefrom, to face the inner circumferential surface of the larger diameter part 46. The connection between the AF-MF changeover ring 31 and the focusing ring 15 is cut off in this manner. The focusing ring 15 is thereby set in a state enabling it to rotate freely in relation to the AF-MF changeover ring 31. On the other hand, the top end of the clutch pin 48 gets into direct contact with the inner circumferential surface of the smaller diameter part 44, when the MF mode is set with the AF-MF changeover ring 31 placed in the MF position in the rearward area. The AF-MF changeover ring 31 and the focusing ring 15 will thereby be joined together to form a unified structure and move together as thus formed into a unified structure. Here, the focusing ring 15 will be put into the state of its connection with the AF-MF changeover ring 31 and the state of its being cut off from such a connection in an arbitrary position in the course of its rotation. The AF-MF changeover ring 31, working together with the focusing ring 15, will form what is generally called "a stageless clutch mechanism".

A second clutch mechanism 53 is provided between AF-MF changeover ring 31 and the AF transmission shaft 26. This second clutch mechanism 53 is constructed in such a manner that it will engage the pinion 25 of the AF transmission shaft 26 with the internal gear 24 of the focusing ring 15, when the AF-MF changeover ring 31 is in the AF position in the forward area, and will cut off the engagement between the pinion 25 of the AF transmission shaft 26 and the internal gear 24 of the focusing ring 15, when the AF-MF changeover ring 31 is in the MF position in the rearward area. To describe this in further detail, the second clutch mechanism 53 is provided with an annular groove 54 formed on the inner circumferential surface of the AF-MF changeover ring 31. A pin 56, set on a clutch plate 55 in such a manner as to project therefrom, is fitted into the annular groove 54. This clutch plate 55 is provided, in a structure unified with it, with a forked part 57 which extends within a plane crossing the optical axis at right angles. The forked part 57 is set in such a way as to enclose the AF transmission shaft 26 at both its sides, and is engaged with the outer side surface of the flange part 58 formed in a structure integrated with the AF transmission shaft 26.

Also, a clutch plate 60, which forms a pair with the clutch plate 55, is fixed on the stationary ring 10, as mentioned above. The clutch plate 60 is provided, in a structure unified with it, with a forked part 61 extending within a plane crossing the optical axis at right angles, in the same manner as in the case of the forked part 57, as mentioned above. The forked part 61 engages itself with the outer side surface of the spring receiving ring 62, which is fitted in a manner permitting its free sliding motion in the AF transmission shaft 26. In the meanwhile, a compressing spring 63 is inserted between the spring receiving ring 62 and the flanged part 58. The compressing ring 63 applies pressing force to the AF transmission shaft 26 for motion in the forward direction, which, in other words, is the direction in which the pinion 25 is put into its engagement with the internal gear. In this regard, the movement of the AF transmission shaft 26 in the forward direction is regulated by the position in which the flange part 58 gets into direct contact with the forked part 57 of the clutch plate 55.

Furthermore, a locking mechanism 65, which locks the rotation of the AF-MF changeover ring 31 when it reaches AF position, is provided between the AF-MF changeover ring 31 and the stationary ring 10. The locking mechanism 65 is provided with a smooth ring-shaped arc surface 69 formed on the surface of the outer circumference of the stationary ring 10 and a plural number of locking grooves 66 formed at equal angular intervals on the smooth arch surface 69. Also, the AF-MF changeover ring 31 has a plural number of locking ball holding holes 70 formed therein, in the state of their penetrating in the direction of its thickness. These locking ball holding holes 70 hold therein locking balls 67 in such a manner that the locking balls 67 may freely move forward and backward along a line in the direction of the radius. These locking balls are pressed by force exerted by means of a plate spring 68 fixed at an end thereof on the surface of the outer circumference of the AF-MF changeover ring 31. They are pushed out of the locking ball holding holes 70 and move outwardly into an area at the inner side of the direction of the radius and brought into their direct contact with the smooth arc surface 69, as mentioned above.

Figure 7:
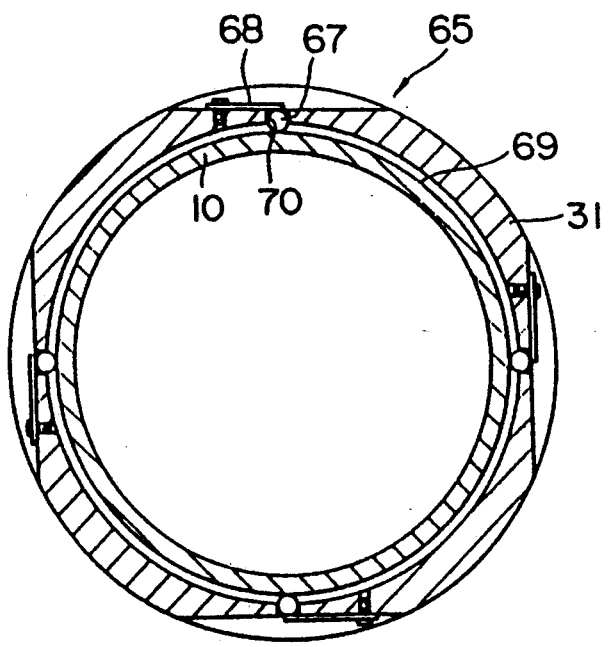
FIG. 7 is a sectional view illustrating the main parts of the locking mechanism in an unlocked state, as cut along the line C—C indicated in FIG. 2, in the construction of the AF-MF changeover ring.

When the AF-MF changeover ring 31 is in the MF position, the locking balls 67 will not be put into any of the locking grooves 66, as shown in FIG. 2 and FIG. 7. As the result, the AF-MF changeover ring 31 is put into such a state that it can rotate freely round the optical axis. When the AF-MF changeover ring 31, on the other hand, has been moved out of the MF position and brought into the AF position, the locking balls 67, contained inside the locking ball holding holes 70, will move forward in a rolling motion along a line in the direction of the optical axis over the smooth arc surface 69 and will get on the outer circumferential surface of the stationary ring 10.

Figure 8:
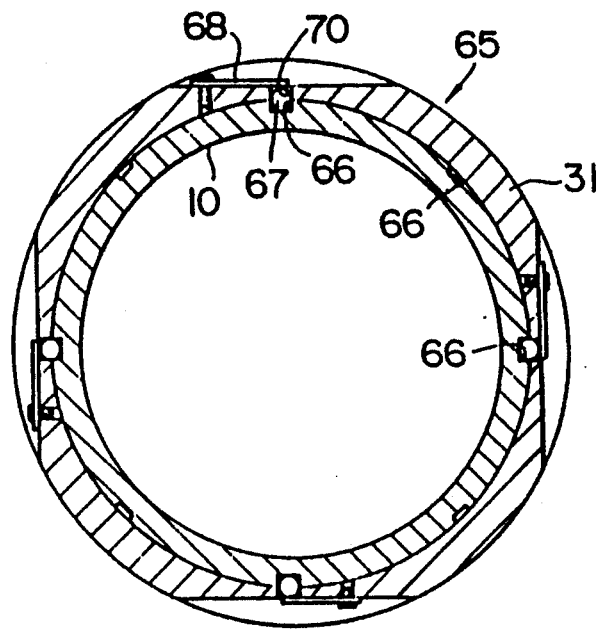
FIG. 8 is a sectional view illustrating the main parts of the locking mechanism in a locked state, as cut along the line D—D indicated in FIG. 1, in the construction of the AF-MF changeover ring.

When the AF-MF changeover ring 31 is rotated round the optical axis in a state in which the locking balls are thus placed on the outer circumference of the stationary ring 10, the individual locking balls 67 will be put into the inside of the facing locking grooves 66, as shown in FIG. 1 and FIG. 8. This is achieved through a pressing force applied by the plate spring 68, at a point in time when the AF-MF changeover ring 31 has been brought to such an angular position that the locking ball holding holes 70, in which the individual locking balls 67 are contained, are set to face the locking grooves 66. In this manner, the focusing ring 15 and the AF-MF changeover ring 31 will be connected with each other in respect of the direction of their rotation, and their rotation will be prohibited (i.e., locked) thereby.

In this regard, the electrical switching between the AF mode and the MF mode can be performed, for example, with a brush (not shown in the drawings) set in its interlocking with the AF-MF changeover ring 31 and a code plate (not illustrated in the drawings) fixed in a state corresponding to it on the stationary ring 10.

Now, the operations performed for the switching between the AF mode and the MF mode in lens barrel, constructed in the manner described above, in the first example of preferred embodiment, will be described below.

As illustrated in FIG. 1, the first clutch mechanism 43 releases the integrated relation in the rotation of the AF-MF changeover ring 31 together with the focusing ring 15, when the AF-MF changeover ring 31 has been moved forward to be set in the AF position, that is, in the state of the lens barrel set in the MF mode. As the result of this operation, the focusing ring 15 is put into a state in which it can rotate independently of the AF-MF changeover ring 31. Moreover, the second clutch mechanism 53 engages the pinion 25 of the AF transmission shaft 26, with the internal gear 24 of the focusing ring 15, when the lens barrel is set in the AF mode. As the result of this operation, the focusing ring 15 is put into the state in which it can be driven to perform its rotation in accordance with the rotation of the AF transmission shaft 26. Furthermore, the locking mechanism 65 locks the AF-MF changeover ring 31 on the stationary ring 10, when the lens barrel is in the state of being set in an AF mode, and thereby prohibits the AF-MF changeover ring 31 from its rotation.

In other words, when the lens barrel is set in the AF mode, the top end of the clutch pin 48, which is supported on the focusing ring 15, is brought to the position where it faces the larger diameter part 46 on the inner circumferential surface of the AF-MF changeover ring 31 and is thus held in a state in which it is not in any contact with the AF-MF changeover ring 31, as shown in FIG. 3. On the other hand, the pinion 25 of the AF transmission shaft 26, being pushed forward by the force applied by the compressing spring 63, is in its engagement with the internal gear 24 of the focusing ring 15. By the effect of this state of engagement, the rotation into which the AF driven shaft 28 is put by the AF driving shaft, provided at the side of the camera body, will be transmitted to the focusing ring 15, with the result that an automatic focusing operation is performed.

Figure 9:
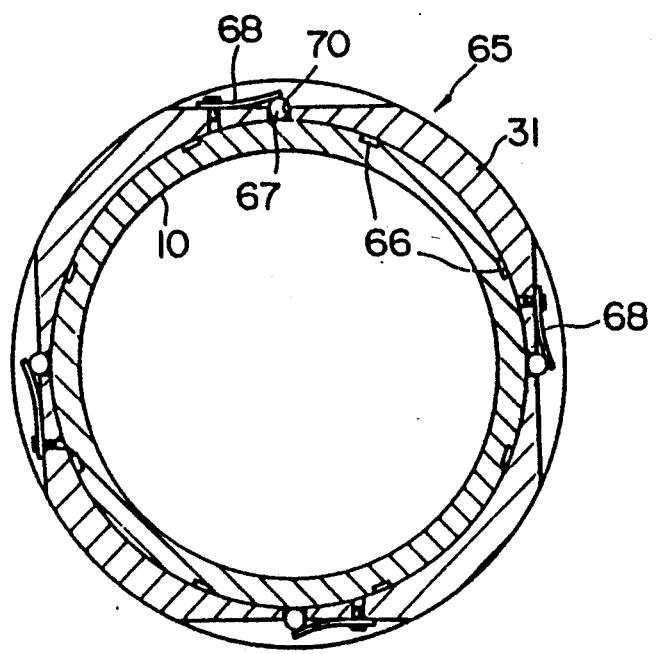
FIG. 9 is a sectional view illustrating the main parts of the locking mechanism in a locked state, as taken along the line D—D indicated in FIG. 1 in the construction of the AF-MF changeover ring in another aspect of an embodiment of the present invention.

At this moment, the locking balls 67 are set in any of the individual locking grooves 66 on the stationary ring 10, as shown in FIG. 8. Here, even in case the locking balls 67 are not fitted into the locking grooves 66, but have moved onto the area on the outer circumference of the stationary ring 10, as shown in FIG. 9, the locking balls 67 will soon be put into the state shown in FIG. 8, if the AF-MF changeover ring 31 is rotated by a small angle in either direction. Therefore, the photographer's operation of the lens barrel, set in the state of the AF mode, will not be liable to any occurrence of inconvenience or awkward sensation caused in the use of the lens barrel. This occurs because the AF-MF changeover ring 31 will not rotate in the AF mode and consequently that the grip part, which is comprised of a decorative facing ring 32, is fitted into the outer circumference of the AF-MF changeover ring 31 and is to be held by the photographer so to not rotate.

In contrast to this, the first clutch mechanism 43 brings the AF-MF changeover ring 31 and the focusing ring 15 into their frictional engagement and thereby puts them into a state in which they rotate together in a unified structure when the AF-MF changeover ring 31 is moved rearward to reach the MF position, i.e., when the MF mode is set, as shown in FIG. 2. Also, in the state in which the lens barrel is set in the MF mode, the second clutch mechanism 53 releases the AF transmission shaft 26 and the focusing ring 15 from their engagement with the internal gear 24, putting them in a state in which the focusing ring 15 is not driven for rotation by the AF transmission shaft 26. Moreover, the locking mechanism 65, operating in a state in which the lens barrel is set in the MF mode, will release the AF-MF changeover ring 31 from its lock-up, so that the AF-MF changeover ring 31 will be thereby put into a state in which it can be rotated by the photographer's hand.

That is to say, the contact area 51, which is at the top end of the clutch pin 48 as supported on the focusing ring 15, is put into a strong frictional contact with the smaller diameter part 44 on the inner circumferential surface of the AF-MF changeover ring 31 when the lens barrel is in this state in which it is set in the MF mode. As shown in FIG. 4, the AF-MF changeover ring 31 and the focusing ring 15 are unified into one structure with respect to the direction of their rotation. On the other hand, the forked part 57 of the clutch plate 55 pushes the rear part of the AF transmission shaft 26 in resistance to the compressing spring 63 along with the rearward movement of the AF-MF changeover ring 31, releasing the focusing ring 15 and the internal gear 24 from engagement. Also, the locking balls 67 get into contact with the smooth arc surface 69 of the stationary ring 10, thereby releasing the AF-MF changeover ring 31 from its lock-up.

When the AF-MF changeover ring 31 is rotated by manual operation in a state with the lock-up thus canceled, the rotation will be transmitted to the focusing ring 15 by way of the smaller diameter part 44, the clutch pin 48, and the clutch pin hole 47. Accordingly, a manual focusing (MF) operation will be performed. In this case, the rotation of the AF driven shaft 28 could not be transmitted to the focusing ring 15 even if the AF driven shaft 28 were put into rotation by the AF driving shaft provided at the side of the camera body. The status of the stops of this AF-MF changeover ring 31, in the AF position and in the MF position, are regulated respectively by the engagement of the clicking balls 35 with the annular V-shaped grooves 33 and the engagement of the clicking balls 35 with the annular V-shaped grooves 34.

It should be noted that the present invention is not limited to the construction described above in the first example of the preferred embodiment, but may be applied effectively to various other modified forms of its embodiment to such an extent as will not deviate from the essential purports and technical scope defined for the present invention.

Now, a plural number of other examples of preferred embodiments of the present invention will be described in the following part. In the description made in the subsequent part, moreover, the same reference marks are attached to those parts identical to the corresponding parts described above in the first example of a preferred embodiment, and their descriptions will be omitted.

FIG. 10 through FIG. 14 illustrate a second example of a preferred embodiment of a lens barrel constructed in accordance with the present invention for use in an automatic focusing camera. In this second example of a preferred embodiment, the construction of the lens barrel is characterized in that a first clutch mechanism 43A, in stages, is employed in place of the first clutch mechanism, which is a stageless clutch 43, as described in the first example of the embodiment given above.

In further detail, a plural number of locking grooves 70 are formed at small angular intervals to extend from the smaller diameter part 44 to the tapered diameter part 45 on the inner circumferential surface of the AF-MF changeover ring 31. In the meantime, a clutch ball 71, which is used here in place of the clutch pin 48, used in the first example of embodiment, is supported on the focusing ring 15 in such a manner as to permit the clutch ball 71 to move freely forward and rearward in the direction of the radius. This clutch ball 31 is thrust outward with force applied to it by a plate spring 50 in the direction of the radius, namely, in the direction in which the clutch ball 71 is to be fitted into the locking groove 70. An end part of this plate spring 50 is fixed with a screw on the inner circumferential surface of the focusing ring 15.

Figure 10:
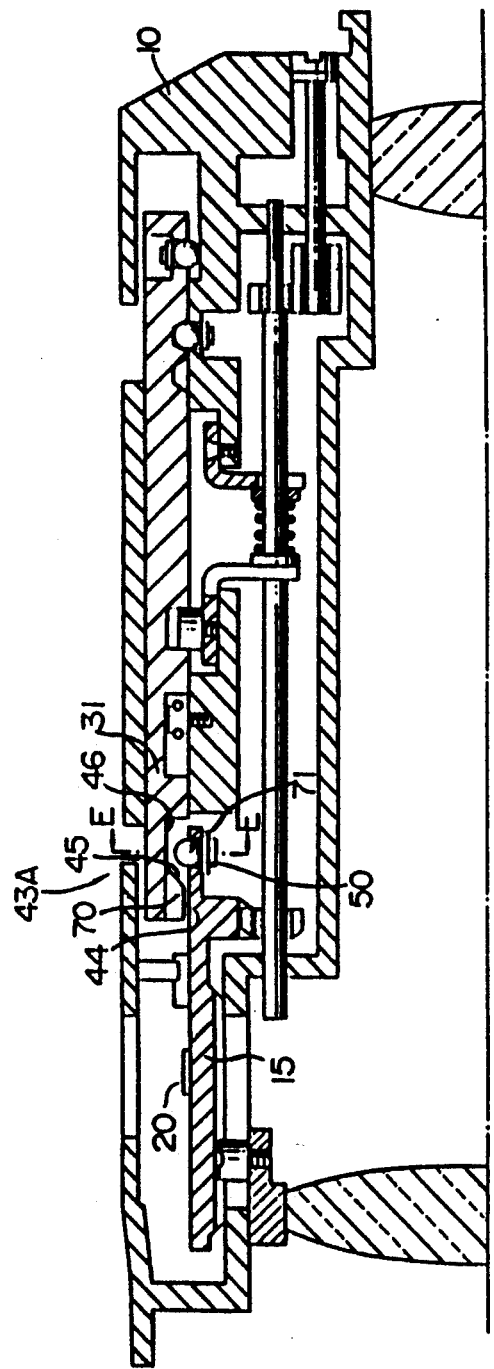
FIG. 10 is an upper-half vertical sectional view illustrating the state of the AF mode of the lens barrel which has been constructed, for use with an automatic focusing camera, as described in the second example of a preferred embodiment of the present invention.
Figure 11:
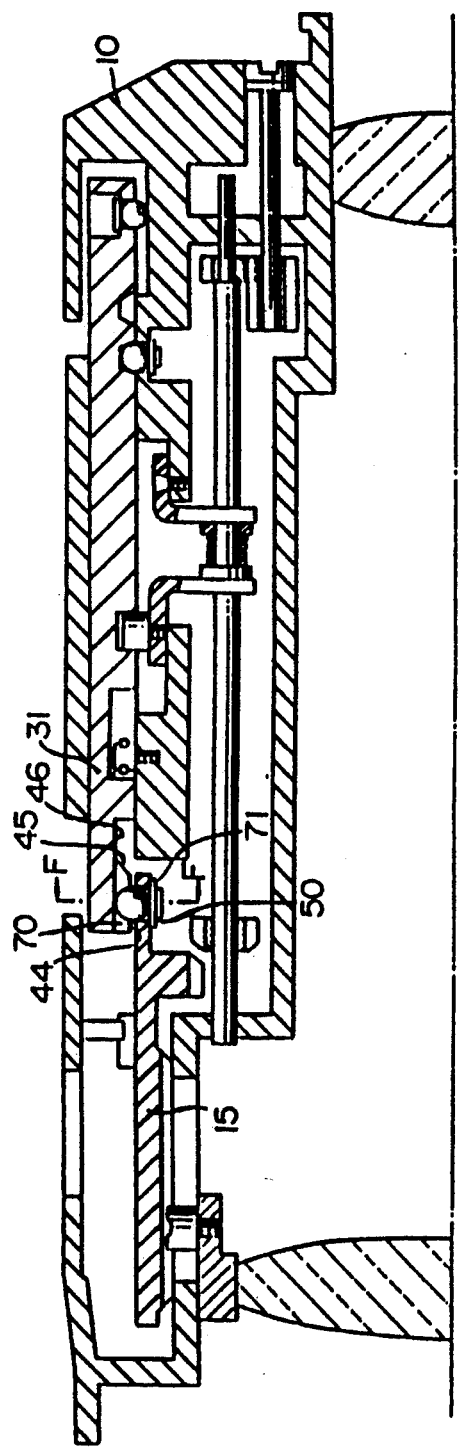
FIG. 11 is an upper-half vertical sectional view illustrating the state of the MF mode of the lens barrel which has been constructed, for use with an automatic focusing camera, as described in the second example of a preferred embodiment of the present invention.
Figure 12:
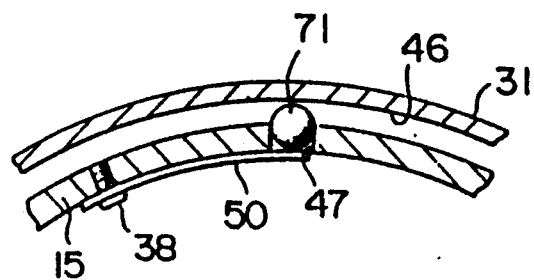
FIG. 12 is a sectional view illustrating the first clutch mechanism in a state set in the AF mode, as shown in FIG. 10, in the construction as taken along the line E—E, indicated in FIG. 10.
Figure 13:
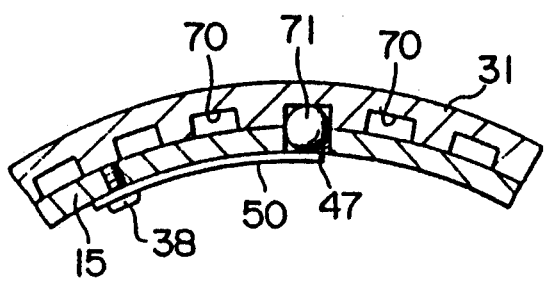
FIG. 13 is a sectional view illustrating the first clutch mechanism in a state set in the MF mode, as shown in FIG. 11, as taken along the line F—F, as shown in FIG. 11.
Figure 14:
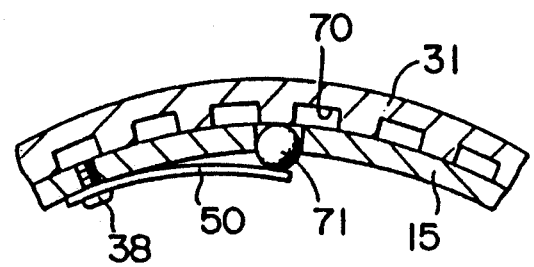
FIG. 14 is a sectional view illustrating the first clutch mechanism in another aspect of an embodiment of the present invention as set in a state in the MF mode, as shown in FIG. 11, in a construction as taken along the line F—F in FIG. 11.

According to this second example of a preferred embodiment, the state in which the AF mode is set up, with the AF-MF changeover ring 31 moved forward as shown in FIG. 10 and in FIG. 12, can be attained just in the same manner as in the first example of preferred embodiment. In contrast with this, the locking groove 70 on the AF-MF changeover ring 31 accepts the clutch ball 71, as shown in FIG. 13. The AF-MF changeover ring 31 and the focusing ring 15 are thereby unified for movement in the same direction of rotation, when the MF mode is set up, with the AF-MF changeover ring 31 moved rearward, as shown in FIG. 11. Now, depending on the position in the rotation of the locking groove 70 round the optical axis, it may happen that the clutch ball 71 does not fit into the locking groove 70, as shown in FIG. 14, when the AF-MF changeover ring 31 has been moved rearward. However, when the AF-MF changeover ring 31 is rotated by a small angle, the lens barrel attains the state shown in FIG. 13, in which the AF-MF changeover ring 31 and the focusing ring 15 are unified into one structure with respect to the direction of their rotation. Accordingly, the MF mode will be attained by the rotation of the AF-MF changeover ring 31.

Also, in the first example of a preferred embodiment described above, it is described that the clutch pin 48 is arranged inwardly in the direction of the radius in relation to the smaller diameter part 44, the tapered diameter part 45, and the larger diameter part 46. Yet, the present invention is not limited to any such construction, but may be applied effectively, for example, to another construction in which this relation, in their arrangement, is reversed.

In further detail, the clutch pin 48 is supported on the AF-MF changeover ring 31 and pushed, with force applied to it, towards the focusing ring 15 in the first example of a preferred embodiment given above. Additionally, a smaller part (which, however, is a non-engaging part), a tapered diameter part (namely, a transition part), and a larger diameter part (which, however, is an engaging part) are to be formed, in the stated order, from a forward position on the outer circumferential surface of the rear part of the focusing ring 15. In a construction formed in the above-described manner, the clutch pin 48, at the side of the AF-MF changeover ring 31 in the AF position, in which the AF-MF changeover ring 31 is moved forward, is brought to a position in which the clutch pin 48 is placed opposite to the smaller diameter part of the AF-MF changeover ring 31. Thus, the AF-MF changeover ring 31 maintains itself in a free state in relation to the focusing ring 15. On the other hand, the clutch pin 48 engages with the outer circumferential surface in the larger diameter part of the focusing ring 15 in the MF position, with the AF-MF changeover ring 31 moved rearward. The AF-MF changeover ring 31 and the focusing ring 15 will thus be unified into one structure with regard to the direction of their rotation by the effect of their frictional engagement.

Similarly, in the second example of a preferred embodiment, a clutch ball 71 is provided in the AF-MF changeover ring 31. A locking groove is formed on the focusing ring 15, so that it can be made possible to hold the focusing ring 15 in its free state in the AF position in relation to the AF-MF changeover ring 31, and yet to put the AF-MF changeover ring 31 and the focusing ring 15 into a unified structure with respect to the direction of their rotation, when the AF-MF changeover ring 31 is set in the MF position.

FIG. 15 through FIG. 20 illustrate a third example of a preferred embodiment of the lens barrel, constructed in accordance with the present invention, for its use with an automatic focusing camera. In this third example of a preferred embodiment, the lens barrel, according to the present invention, is characterized by the point that it is provided with a first clutch mechanism 43B, constructed in such a manner, that the AF-MF changeover ring 31 and the focusing ring 15 are set into their unified structure by an engagement of locking pinion 76 with a rack-form locking groove part 81.

Figure 20:
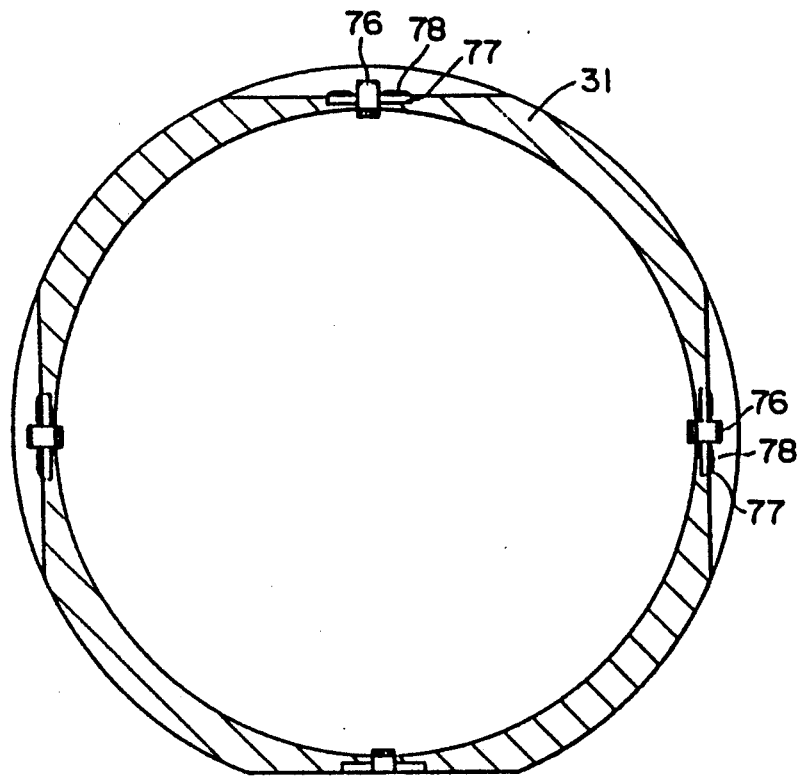
FIG. 20 is a front sectional view illustrating the front end part of the AF-MF changeover ring and the state of arrangement of a locking pinion provided at the front end part of the ring.

To describe this point in further detail, this first clutch mechanism 43B is provided with the locking pinion 76 installed in several places in the direction of the circumference of the AF-MF changeover ring 31, as shown in FIG. 20. Further, on the surface of the outer circumference in the rear part of the focusing ring 15, a rack-form unlocking groove part 80 and the rack-form locking groove part 81, which are to be set into their respective engagement with this locking pinion 76, are formed located adjacent to each other along a line in the direction of the optical axis. That is to say, the unlocking groove part 80 is arranged in a forward area along the line in the direction of the optical axis while the locking groove part 81 is arranged in a rearward area along the line in the direction of the optical axis.

In this case, the focusing ring 15 is formed in a cylindrical shape. Therefore, when the datum pitch line of the rack-form unlocking groove part 80 is considered as a cylindrical surface formed by the effect of its rotation along the surface of this cylindrical shape, it is possible to define its diameter as $\phi PC1$, and similarly to define the diameter of the cylindrical shape based on the datum pitch line of the locking groove part 81 as $\phi PC2$. In this regard, the diameter $\phi PC2$, which defines the datum pitch line of this locking groove part 81, is to be formed larger just by 2 a than the diameter $\phi PC1$ which defines the datum pitch line of the unlocking groove part 80. That is to say, this indicates a clearance between the datum pitch line 80a of the unlocking groove part 80 and the pitch circle 76a of the locking pinion 76. Moreover, both outer diameters of the rack-form unlocking groove part 80 and the outer diameter of the rack-form locking groove part 81 are defined as $\phi D1$, and both of these are set to be equal to each other.

The first clutch mechanism 43B, set up in this manner, has a concave part 82 in the forward end part of the AF-MF changeover ring 31. At the forward end of the concave part 82, a shaft bearing groove part 75 is formed. The shaft bearing groove part 75 is comprised of a bearing housing part 75a, which houses a supporting shaft 77 for supporting the locking pinion 76, in such a manner as to rotate freely. A pinion housing part 75b, which accommodates the locking pinion, is positioned in the center of the supporting shaft 77 in such a manner as to be capable of rotating freely and to be prohibited from its movement in the rightward and leftward directions. The width of the supporting shaft housing part 75a, extending in the forward and backward directions, is formed in a size approximately equal to the diameter of the supporting shaft 77, and thus restricts the supporting shaft 77 housed therein against movement in the forward and backward direction. Also, the depth of the supporting shaft housing part 75a is made smaller than the diameter of the supporting shaft 77. Thus, the supporting shaft housing part 75a is constructed in such a manner as to cause the upper side part of the supporting shaft 77 housed therein to project upward.

Here, plate springs 78 are arranged on the right and left of the locking pinion 76 in correspondence with the supporting shaft 77. The rear end parts of the right and left plate springs 78 are fixed with screws 79 on the rear end part of the concave part 82. Due to the upper side part of the supporting shaft 77 projecting upward out of the supporting bearing housing part 75a, the right and left plate springs 78 apply pressing force to the right and left supporting shafts 77, and consequently to the locking pinion 76 for movement towards the rack-form unlocking groove 80 or the rack-form locking groove 81.

Figure 15:
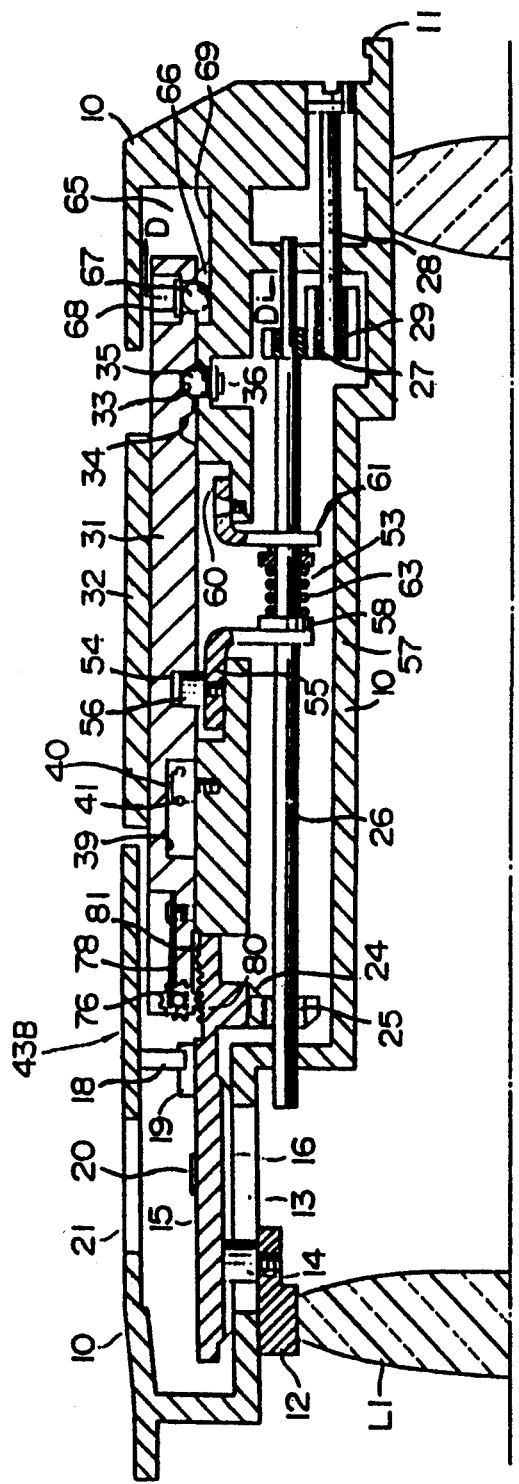
FIG. 15 is an upper-half vertical sectional view illustrating the state of the AF mode of the lens barrel which has been constructed, for use with an automatic focusing camera, as described in the third example of a preferred embodiment of the present invention.
Figure 17:
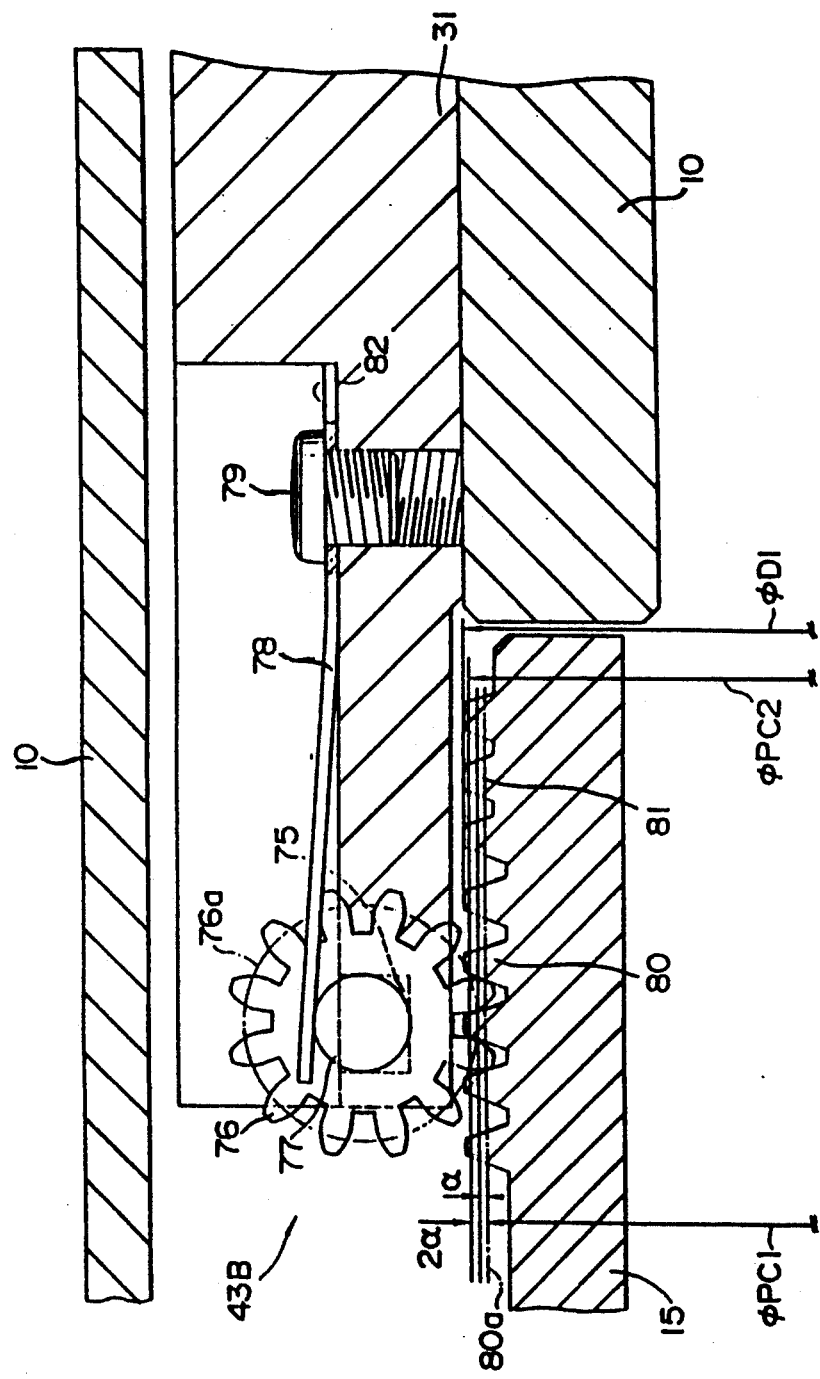
FIG. 17 is a lateral sectional view illustrating on a magnified scale the main parts of the first clutch mechanism in a state of being set in the AF mode, as shown in FIG. 15.

According to the third example of a preferred embodiment, in the construction formed in this manner, the locking pinion 76 engages its teeth with the rack-form unlocking groove part 80, by the effect of the pressing force exerted by the plate spring 78, in a state in the MF mode set with the AF-MF changeover ring 31 moved forward, as shown in FIG. 15 and FIG. 17. Yet, there is a clearance a between the pitch circle 76a of the locking pinion 76 and the datum pitch line 80a of the unlocking groove part 80. Therefore, the locking pinion 76 will be able to move freely in the direction of the circumference. Accordingly, the AF-MF changeover ring 31 and the focusing ring 15 will not be set into any unified structure, and the AF-MF changeover ring 31 and the focusing ring 15 will therefore be permitted, respectively, to perform their free relative rotations, performing an automatic focusing operation, despite the presence of the locking pinion 76.

Figure 16:
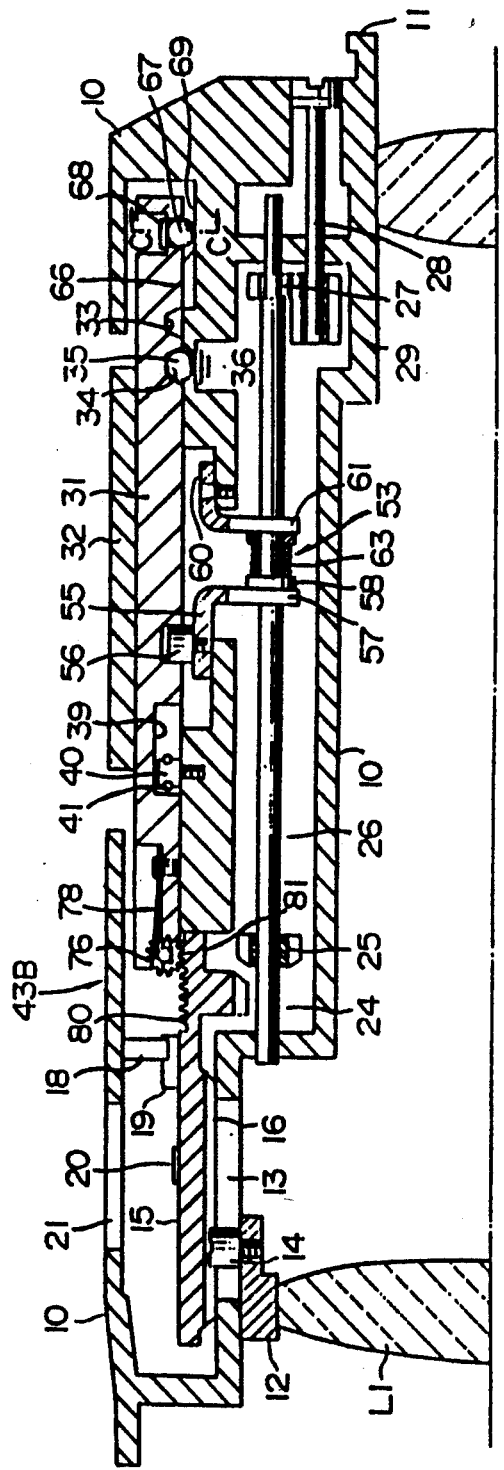
FIG. 16 is an upper-half vertical sectional view illustrating the state of the MF mode of the lens barrel which has been constructed, for use with an automatic focusing camera, as described in the third example of a preferred embodiment of the present invention.
Figure 18:
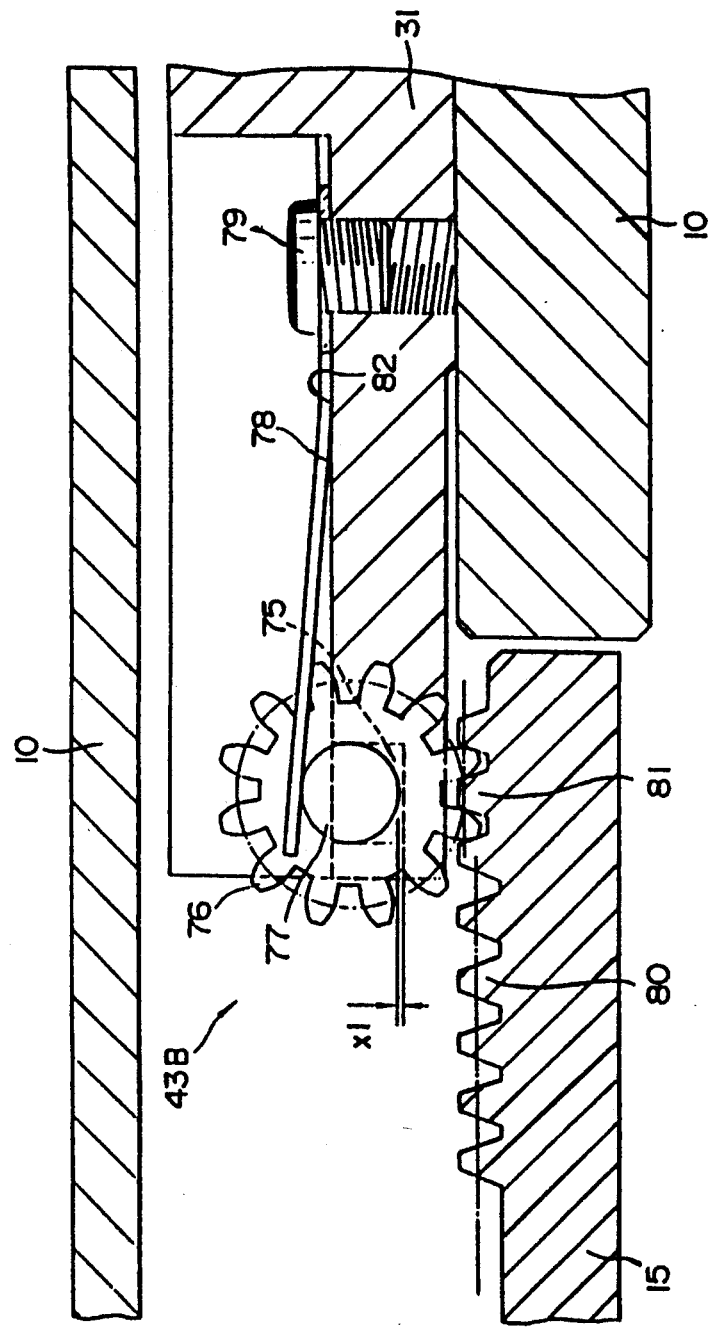
FIG. 18 is a lateral sectional view illustrating, on a magnified scale, the main parts of the first clutch mechanism in its state of being set in the MF mode, as shown in FIG. 16.
Figure 19:
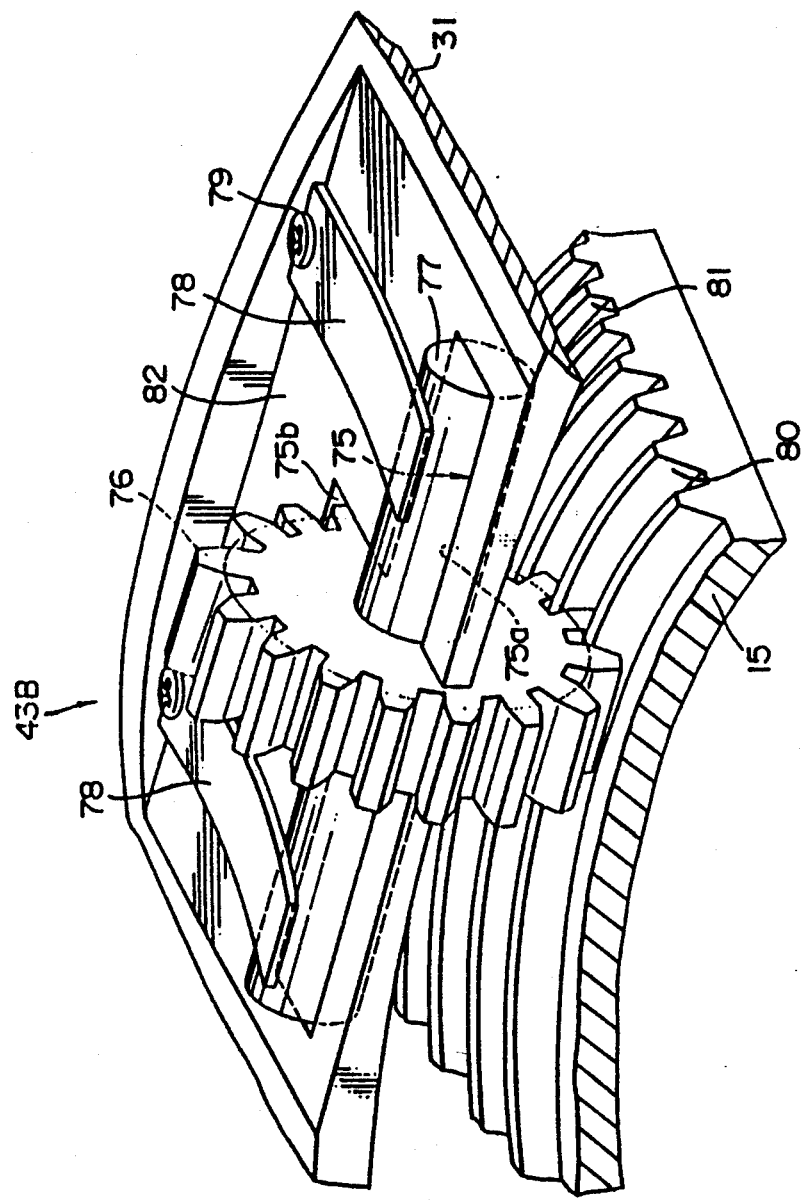
FIG. 19 is a slant perspective view illustrating the first clutch mechanism, as shown in FIG. 17, as viewed from a point off to the right in front of it.

On the other hand, the locking pinion 76 moves in rotation, together with the AF-MF changeover ring 31, on the rack-form unlocking groove part 80 when the AF-MF changeover ring 31 is moved to a rearward area and engages the locking groove part 81, as shown in FIG. 16 and FIG. 18. In this case, the outer diameter of the rack-form locking groove part 81 is equal to that of the rack-form unlocking groove part 80. The diameter $\phi PC2$ based on the datum pitch line of the locking groove part 81 is formed larger than the diameter $\phi PC1$ determined on the basis of the datum pitch line of the unlocking groove part 80. Because of this construction, the locking pinion 76 will be pushed up by just x1, together with the supporting shaft 77.

As the result of this operation, the locking pinion 76 will receive the pressing force intensified in correspondence with the amount of flexure of the plate spring 78, which is in the state of its flexure by an amount corresponding to the amount of movement x1, from the plate spring 78 via the supporting shaft 77. Now that the locking pinion 76 is pressed strongly with the above-mentioned pressing force against the rack-form locking groove 81, strong frictional force is generated between the locking pinion 76 and the rack-form locking groove 81. Therefore, the focusing ring 15, being prevented from its relative movement in relation to the AF-MF changeover ring 31, is set into a unified structure with the AF-MF changeover ring 31 in respect to the direction of their rotation, and performs an MF operation.

In the third example of preferred embodiment, the locking pinion 76 moves in rotation over the rack-form unlocking groove part 80 and the rack-form locking groove part 81, when the AF-MF changeover ring 31 is moved to a rearward area in relation to the focusing ring 15. The resisting force of the locking pinion 76 in the direction of movement is therefore made extremely small. By this, the operating feeling of the AF-MF changeover ring 31 can be improved.

Further, FIG. 21 through FIG. 25 illustrate a fourth example of a preferred embodiment of the lens barrel constructed in accordance with the present invention for use with an automatic focusing camera. In this fourth example of a preferred embodiment, the lens barrel is characterized by being provided with a clutch mechanism 43C. This first clutch mechanism 43C has a construction which is different from the first clutch mechanism 43B described in the third example of a preferred embodiment given above wherein the clutch mechanism 43C in the example has a smaller diameter part 83 while it does not have any rack-form unlocking groove part 80 on the rear end part of the focusing ring 15, but entirely identical in all the other respects. To describe this construction in greater detail, the smaller diameter part 83 has a clearance x2 between itself and the teeth of the locking pinion 767. Owing to this feature in its construction, the locking pinion 76 is kept in a state in which it cannot get into any contact with the focusing ring 15, on the outer circumferential surface of the smaller diameter part 83.

Figure 21:
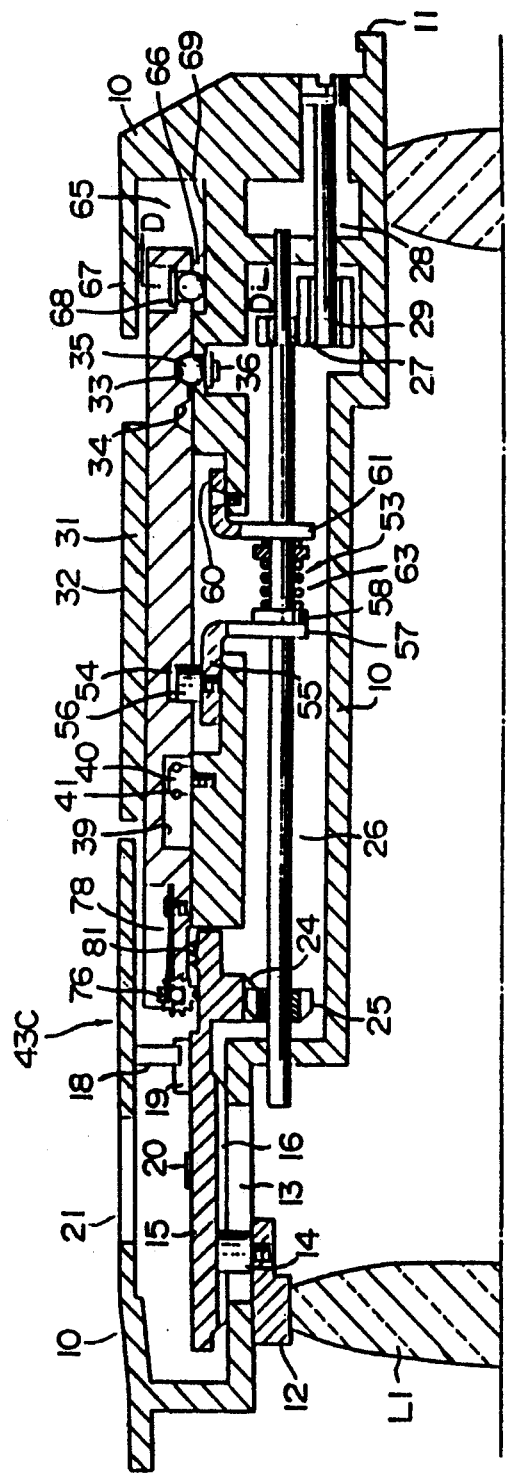
FIG. 21 is an upper-half vertical sectional view illustrating the state of the AF mode of the lens barrel which has been constructed, for use with an automatic focusing camera, as described in the fourth example of a preferred embodiment of the present invention.
Figure 22:
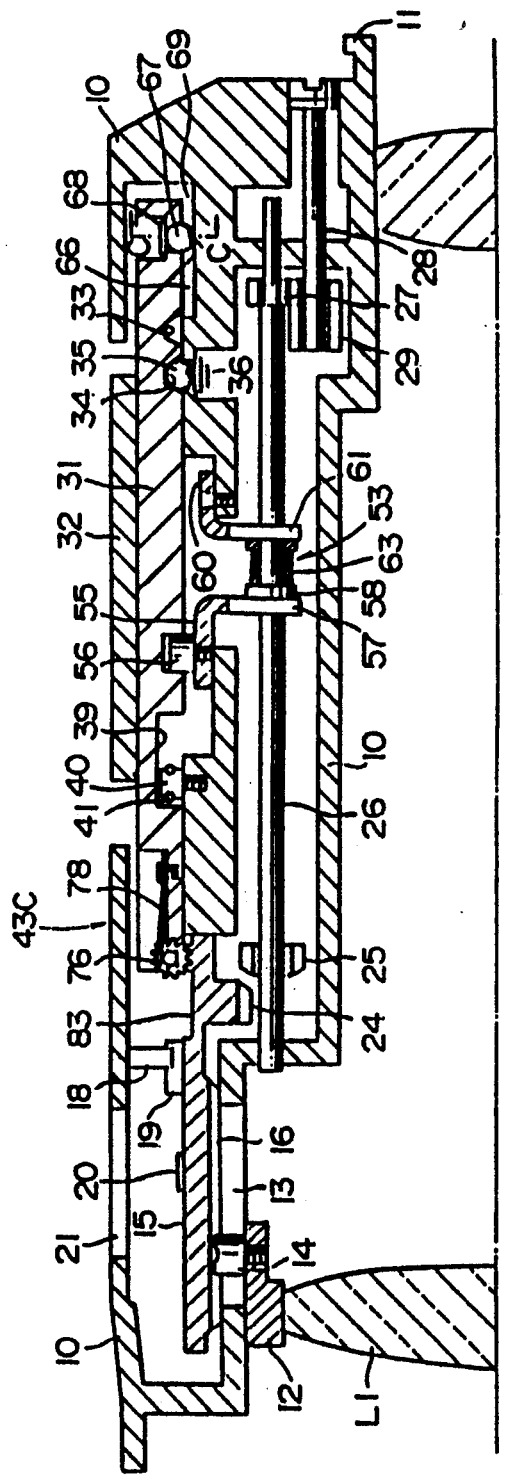
FIG. 22 is an upper-half vertical sectional view illustrating the state of the MF mode of the lens barrel which has been constructed, for use with an automatic focusing camera, as described in the fourth example of a preferred embodiment of the present invention.
Figure 23:
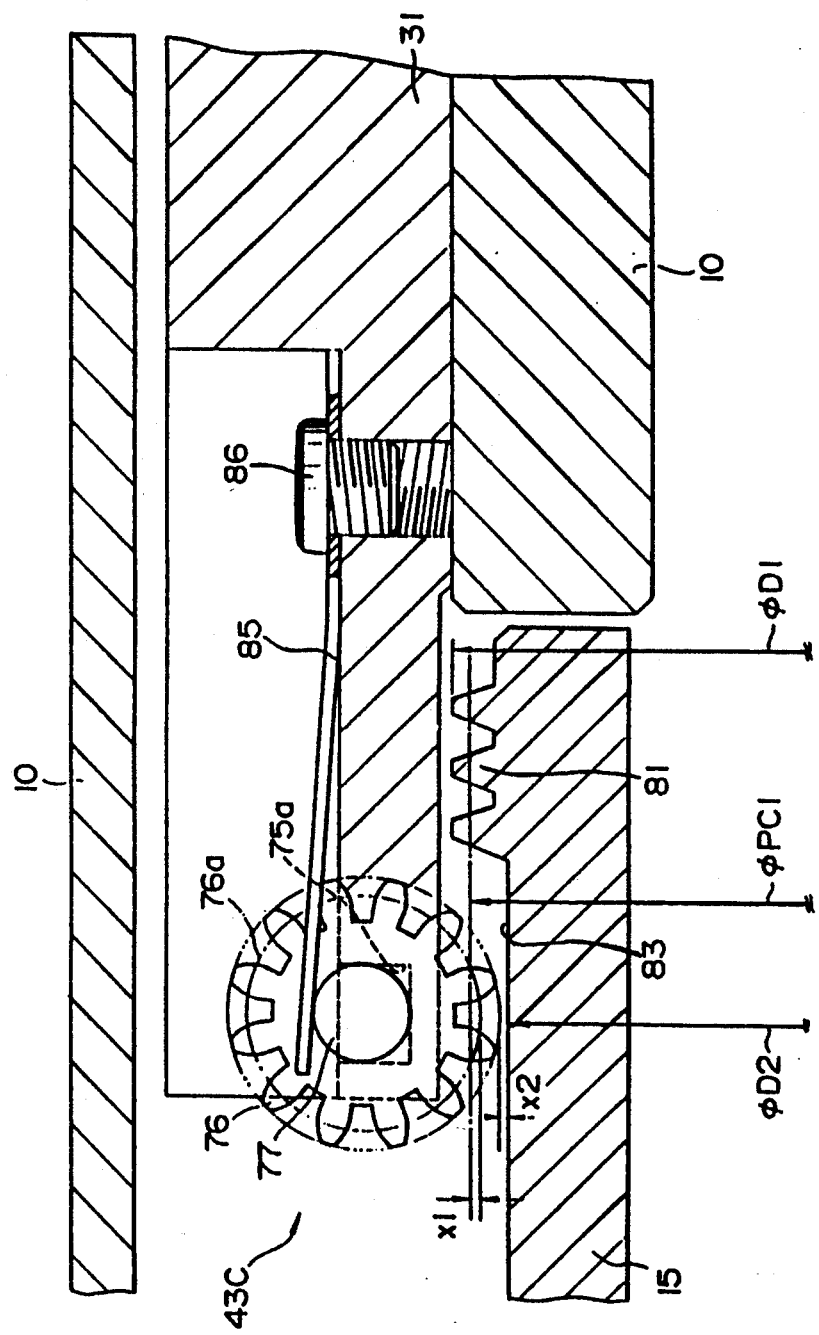
FIG. 23 is a lateral sectional view illustrating on a magnified scale, the main parts of the first clutch mechanism in a state of being set in the MF mode, as shown in FIG. 22.
Figure 24:
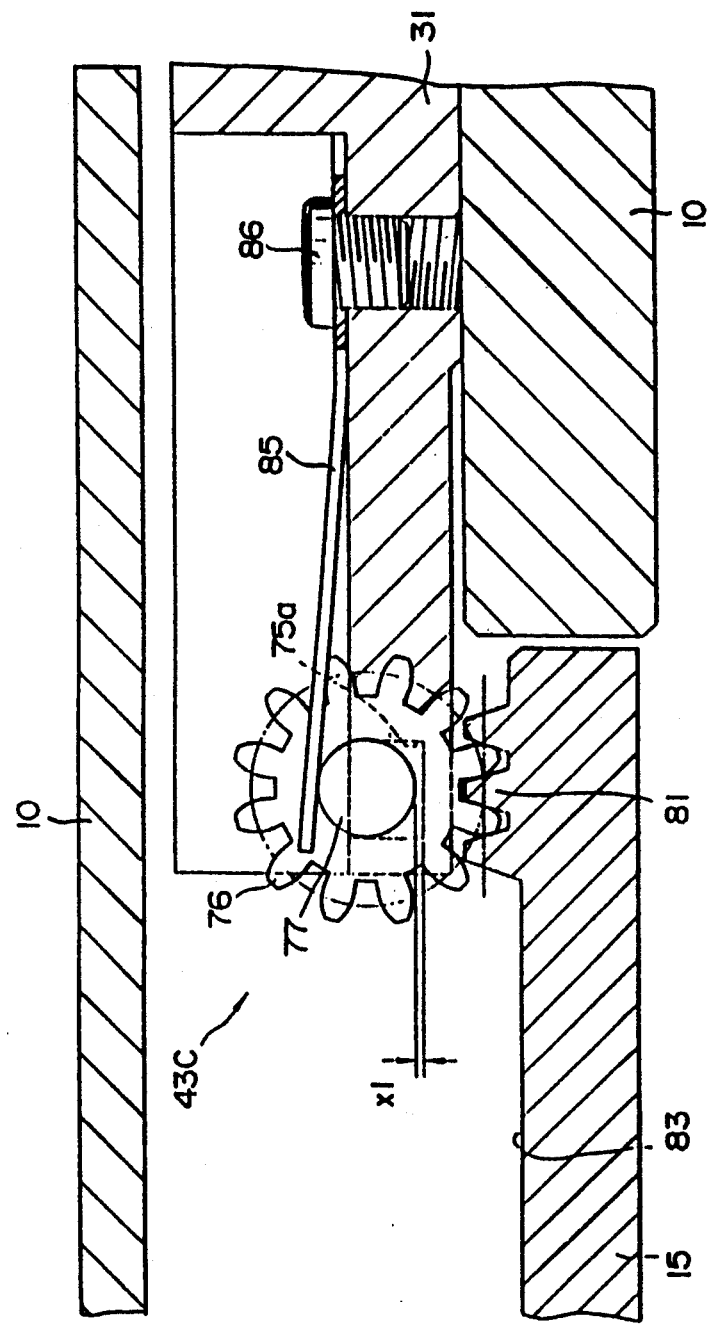
FIG. 24 is a lateral sectional view illustrating on a magnified scale, the main parts of the first clutch mechanism in a state of being set in the AF mode, as shown in FIG. 21.
Figure 25:
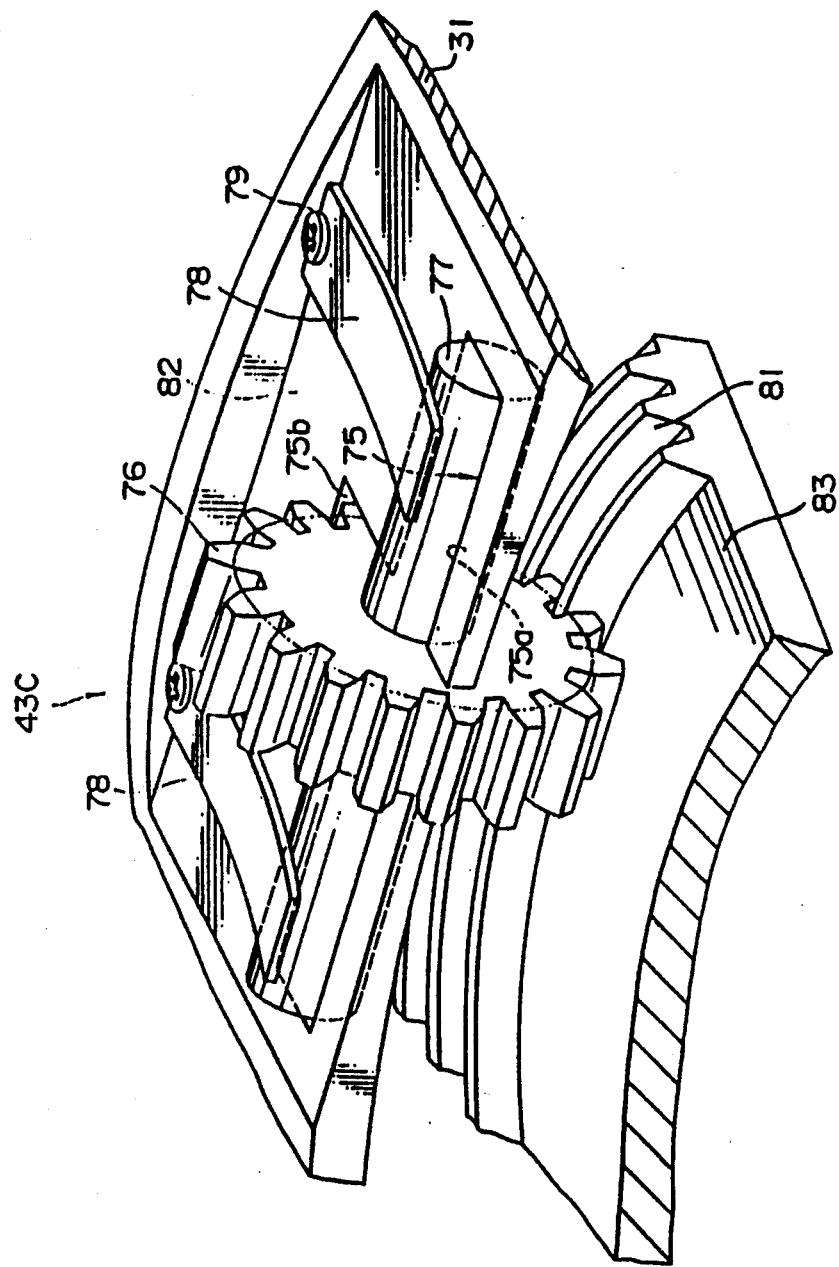
FIG. 25 is a slant perspective view illustrating the first clutch mechanism, as shown in FIG. 24, as viewed from a point off to the right in front of it.

That is to say, the construction of the lens barrel in the fourth example of a preferred embodiment does not set the AF-MF changeover ring 31 and the focusing ring 15 into any unified structure in a state in which the lens barrel is set in the AF mode, with the AF-MF changeover ring 31 moved to a forward area, as shown in FIG. 21 and FIG. 23, but permits the focusing ring 15 to be rotated freely in relation to the AF-MF changeover ring 31. Moreover, as shown in FIG. 22 and FIG. 24, this construction causes the locking pinion 76 to get onto the locking groove part 81, with the locking pinion 76 being pressed strongly onto the locking groove part 81, so that frictional force is generated, in the same manner as in the case of the third example of a preferred embodiment, as described above. In this manner, the AF-MF changeover ring 31 and the focusing ring 15 are unified into one structure in respect of the direction of their rotation, so that a state permitting an MF operation is thereby attained.

In the third example and the fourth examples of the preferred embodiments described above, the present invention will still hold valid and effective even if the relation in the arrangement of the locking pinion 76 on one part, and the rack-form unlocking groove part 80 and the rack-form locking groove part 81 is reversed. That is to say, the construction of the lens barrel described in the third example of a preferred embodiment will still attain the same effect even if it is provided with a locking pinion 76 installed on the focusing ring 15 in such a state as the locking pinion 76 is pressed against the inner side in the direction of the radius. The rack-form locking groove part 81 is formed on the outer circumference in the front end part of the AF-MF changeover ring 31, and the rack-form unlocking groove apart 80 is formed behind the locking groove part 81. In the fourth example of a preferred embodiment, moreover, the same effect can be achieved with a construction in which the lens barrel is provided with the locking pinon 76 installed on the AF-MF changeover ring 31, in such a state that the locking pinion 76 is pressed inwardly in the direction of the radius. The rack-form locking groove part 81 is provided on the outer circumference of the front end part of the AF-MF changeover ring 31, and the smaller diameter part 83 is provided behind the locking groove part 81.

Now, in the first through the fourth examples of the preferred embodiments described above, the present invention is applied to an AF lens barrel which derives the driving force for the AF operations from the side of the camera body. Yet, it goes without saying that the present invention can be applied in its full effect also, for example, to the AF lens barrel of the type in which the AF motor is built into the inside of the lens barrel.

In the manners and constructions described above, the lens barrels described in the first through the fourth examples of the preferred embodiments are respectively provided with an AF-MF changeover ring 31 which can be moved linearly in the direction of the optical axis and can also be rotated around the optical axis. The AF-MF changeover ring 31 permits a manual focusing operation to be performed when the AF-MF changeover ring 31 is set in the MF position while causing the lens barrel mechanism to perform an automatic focusing operation when the AF-MF changeover ring 31 is set in the AF position, without setting the AF-MF changeover ring 31 into rotation. Therefore, the AF-MF changeover ring 31 does not rotate at the time of the AF operation. Hence, the present invention offers a lens barrel excellent in its operating facility without requiring any shift in the hold on the lens barrel on the occasion of a shift to the operation in the MF mode, since the lens barrel mechanism permits the photographer to hold the AF-MF changeover ring 31 at the time of an AF operation. This provides much improved foldability of the lens barrel, and enables the photographer to perform a manual operation by rotating the AF-MF changeover ring 31 after the lens barrel is switched over to the state of its operation in the MF mode.

Moreover, in the first through the fourth of the examples of the preferred embodiments given above, it is described that the AF-MF changeover ring 31 is provided in its rear part with a clicking mechanism for making clicks for setting the AF-MF changeover ring 31 in the AF position or the MF position. Yet, the present invention is not to be limited to a construction like this, but may be applied effectively to any other construction formed in the manner shown in the fifth example of a preferred embodiment in FIG. 26 through FIG. 29.

That is to say, the clicking mechanism in this fifth example of preferred embodiment is arranged in the front part of the AF-MF changeover ring 31. In further detail, the focusing ring 15 described above is provided with a toothed wheel 118 fixed coaxially on the rear part thereof. The internal gear 24 mentioned above is fixed on the inner circumference of this toothed wheel 118. In the meantime, a joint 127, which is to be connected with the AF shaft provided inside the camera body, is formed on the rear end part of the AF transmission shaft. The pinion 25 is always pressed by a compressing spring 128 for forward movement, that is, in the direction in which it is set into engagement with the internal gear 24.

Figure 26:
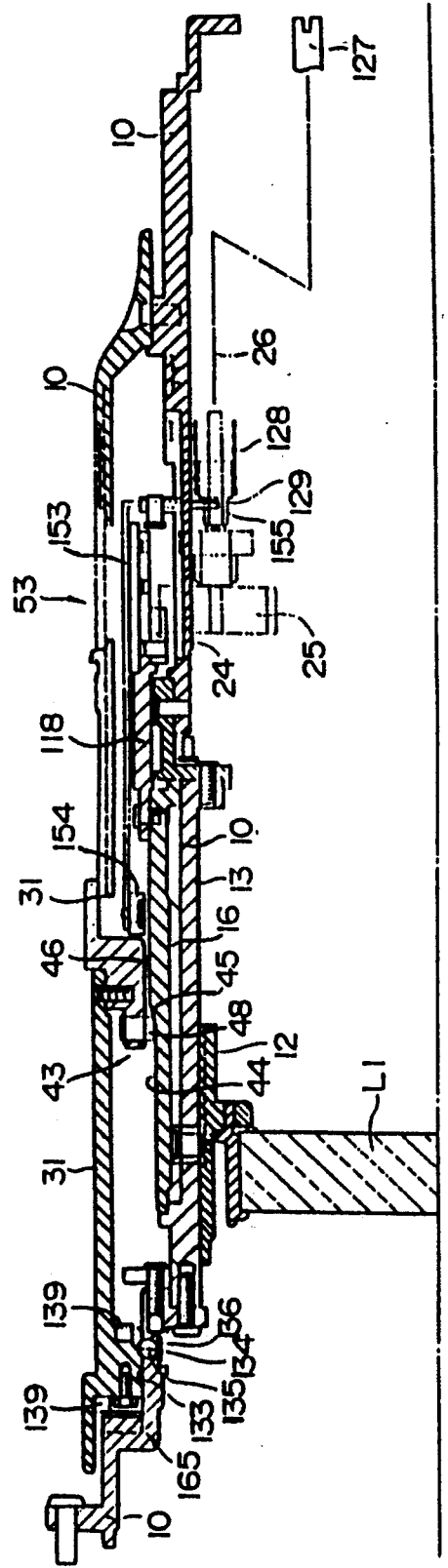
FIG. 26 is an upper-half vertical sectional view illustrating the state of the AF mode of the lens barrel which has been constructed, for use with an automatic focusing camera, as described in the fifth example of a preferred embodiment of the present invention.
Figure 27:
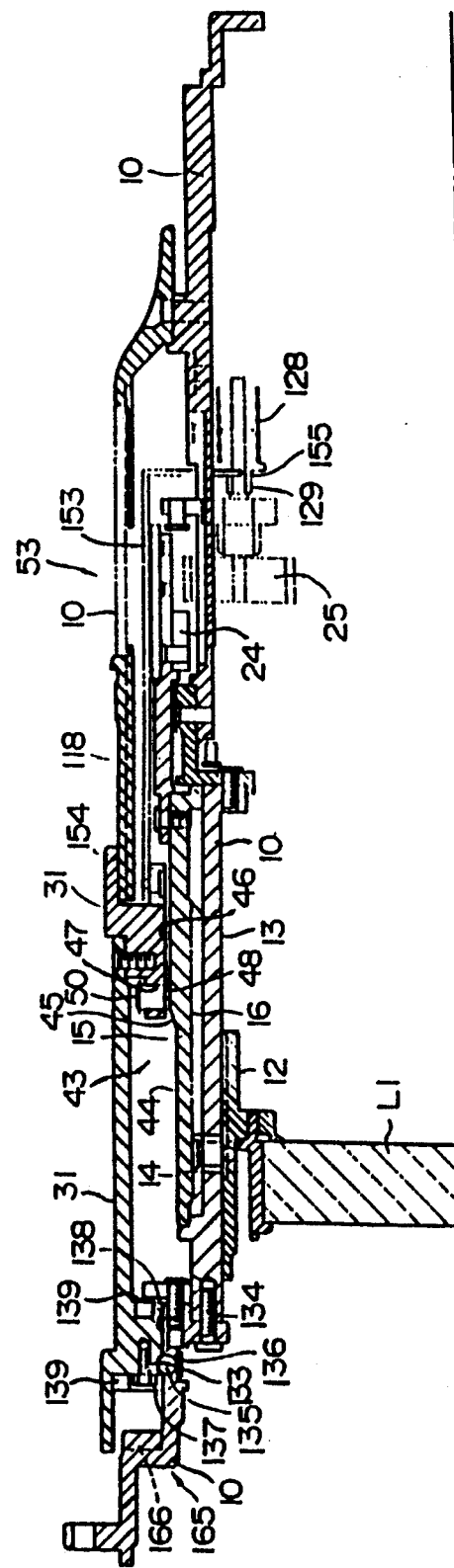
FIG. 27 is an upper-half vertical sectional view illustrating the state of the MF mode of the lens barrel which has been constructed, for use with an automatic focusing camera, as described in the fifth example of a preferred embodiment of the present invention.

The stationary ring 10 is provided, on the outer circumference of its front part, with the AF-MF changeover ring 31 in such a manner as to be capable of freely making its forward and backward movement in the direction of the optical axis and freely making its rotating operation around the optical axis. In the fifth example of a preferred embodiment, the AF position is defined in the position reached when the AF-MF changeover ring 31 is moved to the end point for movement in the forward direction, as shown in FIG. 26. The MF position is defined in the position reached when the AF-MF changeover ring 31 is moved to the end point for movement in the rearward direction, as shown in FIG. 27. On the inner circumferential surface in the front part of the AF-MF changeover ring 31, annular V-shaped grooves 133 and 134 are formed in their correspondence with the AF position and the MF position set in the manner described above. On the outer circumferential surface of the stationary ring 10, a click ball 135, which fits selectively into either one of these annular V-shaped grooves 133 and 134, and a plate sprint 136, which applies its pressing force to the click ball 135 for its movement outward in the direction of the radius. The AF-MF changeover ring 31 is provided, on the inner surface, in its front part, also with a moving range limiting walls 137 and 138, which limit the movement of the AF-MF changeover ring 31 in the direction of the radius. These moving range limiting walls 137 and 138 are in their direct contact with a part of the stationary ring 10, thereby limiting the forward and backward moving ranges of the AF-MF changeover ring 31. The moving range limiting walls 137 and 138 are provided with elastic members 139 for use as buffers at the time of a collision with the walls of the stationary ring 10.

A first clutch mechanism 43, which is identical in its construction with that of the first clutch mechanism in the first example of a preferred embodiment given above, is provided between the AF-MF changeover ring 31 and the focusing ring 15. Also, in the fifth example of a preferred embodiment, a clutch plate 153 is provided as a second clutch mechanism 53. The clutch plate 153 is supported on the stationary ring 10 in such a manner that the clutch plate 153 may move in the direction parallel with the optical axis while it is kept in the state in which it is positioned in the rear part of the AF-MF changeover ring 31. A roller 154, which gets into its direct contact with the AF-MF changeover ring 31, is provided at the top end of the clutch plate 153. Also, a forked part 155, which engages itself with a fore-and-aft moving wheel 129, formed in a unified structure with the opinion 25, is formed at the rear end of the clutch plate 153.

When the AF-MF changeover ring 31 is moved to the MF position in a rearward area, the clutch plate 153 will be pushed backward by the AF-MF changeover ring 31. The AF-MF changeover ring 31, thus moved to the MF position, moves the pinion 25 by means of the forked part 155 and the fore-and-aft moving wheel 129, to a position in which the pinion 25 will not be engaged with the internal gear 24. Moreover, when the AF-MF changeover ring 31 moves to the AF position in a forward area, the pinion 25 and the clutch plate 153 are moved to a position in the forward area by the force of the compressing spring 128, so that the pinion 25 will set itself into engagement with the internal gear 24.

Further, a locking mechanism 165, which locks the AF-MF changeover ring 31 when the AF-MF changeover ring 31 is moved to the AF position, is provided between the front end part of the AF-MF changeover ring 31 and the stationary ring 10. The locking mechanism 165 has a plural number of locking grooves 166 at an appropriate angular interval in relation to the stationary ring 10, as shown in detail in FIG. 28 and FIG. 29. Also, the AF-MF changeover ring 31 is provided with locking pins 167, which engage the locking grooves when the AF-MF changeover ring 31 is in the AF position, and a force applying spring 168, which applies force to the locking pin 167 forward along a line in the direction of the optical axis. The locking pin 167 is prevented from falling off by a plug 169 which is fixed by a screw joint on the AF-MF changeover ring 31.

Figure 28:
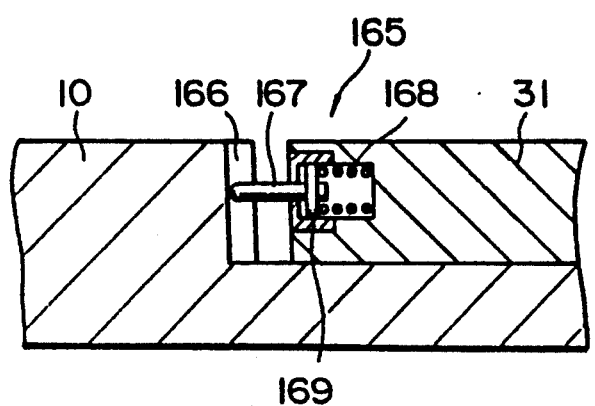
FIG. 28 is a sectional view illustrating the main parts of the locking mechanism in a locked state in the construction of the AF-MF changeover ring.

The lens barrel, which is constructed in the manner described above in the fifth example of a preferred embodiment of the present invention therefore, operates in the manner described in the following:

First, in the state in which the lens barrel is set in the AF mode, with the AF-MF changeover ring 31 moved to a forward point, as shown in FIG. 26, the first clutch mechanism 43 releases the AF-MF changeover ring 31 and the focusing ring 15 from their relation for rotation in a unified structure. The clutch plate 153 permits the pinion 25 and the internal gear 24 into engagement. The locking mechanism 165 locks the AF-MF changeover ring 31 on the stationary ring 10. That is to say, the forward end of the clutch pin 48, which is supported on the AF-MF changeover ring 31, is located in the position of the smaller diameter part on the outer surface of the focusing ring 15, maintaining itself in a state of noncontact or slight friction with the focusing ring 15. The pinion 25 moves forward by the pressing force applied to it by the compressing spring 128 and into engagement with the internal gear 24. The locking pin 167 of the locking mechanism 165 is set into any one of the locking grooves 166 formed on the stationary ring 10, as shown in FIG. 28.

In the state in which the AF mode is set, an AF operation is performed in the same manner as in the case of the first example of a preferred embodiment, as described above. In the state in which the AF mode is set, the AF-MF changeover ring 31 will soon assume the state, as shown in FIG. 26, when the AF-MF changeover ring 31 is rotated by a small angle in either rotating direction, even if the locking pin 1167 is not yet set in the locking groove 166. Therefore, in the state of the lens barrel set in the AF mode, the AF-MF changeover ring 31 will not rotate. Consequently, the lens barrel, according to this invention, is not liable to cause any awkward sensation or any inconvenience during use as the result of the inadvertent rotation of the grip part.

Figure 29:
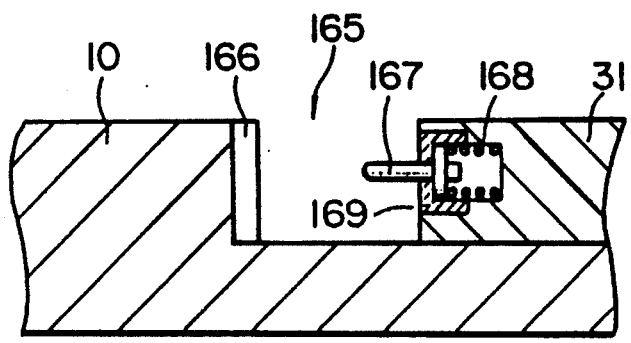
FIG. 29 is a sectional view illustrating the main parts of the locking mechanism in an unlocked state, in the construction of the AF-MF changeover ring.

In contrast to this, when the lens barrel is set into the state of the MF mode, with the AF-MF changeover ring 31 moved to a rearward point, as shown in FIG. 27, the clutch plate 153 releases the pinion 25 of the AF transmission shaft 26 from engagement with the internal gear of the focusing ring 15, and the locking mechanism 165 releases the lock on the AF-MF changeover ring 31. Moreover, along with the movement of the AF-MF changeover ring 31 to a rearward point, the forked part of the clutch plate 153 pushes the pinion 25 rearward in resistance to the compressing spring 128, thereby releasing the focusing ring 15 from engagement with the internal gear 24. Also, the locking pin 167 comes off from the locking groove 166, as shown in FIG. 29, and releases the lock on the AF-MF changeover ring 31. When the AF-MF changeover ring 31 is rotated by manual operation while the lens barrel is in this state, the rotation motion is transmitted to the focusing ring 15 by way of the clutch pin 48, the clutch pin hole 47, and the part 45. Therefore, an MF operation is performed.

Even if the AF transmission shaft happens to be rotated by the AF transmission shaft provided at the camera body side, the rotation will not be transmitted to the focusing ring 15, because the position of the AF-MF changeover ring 31, on a line in the direction of the optical axis, is restricted (with a click) by the engagement of the click ball 135 with the annular V-shaped groove 133. Next, with reference to FIG. 30 through FIG. 37, a detailed description will be made of a sixth example of a preferred embodiment in which a lens barrel is made in accordance with the present invention for use with an automatic focusing camera. In the following description, however, those parts which are identical with the corresponding parts, already described in the first example of a preferred embodiment given above, will be indicated with the same reference marks attached to them, and they will be omitted from the description given below.

In the sixth example of the preferred embodiment, an internal gear 24, which is in a state of constant meshing with a focusing ring interlocking gear 225, is axially supported on the stationary ring 10, in such a manner as to rotate freely round an rotating axial line, which is set up in parallel with the optical axis. Also, a driving shaft 227 is provided in coaxial arrangement with the focusing ring interlocking gear 225, and in such a state as to move in relation to the focusing ring interlocking gear 225 along a line in the direction of the optical axis. In the sixth example of a preferred embodiment, the construction of the lens barrel presents a distinct difference from that of the lens barrel in the first through the fifth of the examples of the preferred embodiments, described above, in that a second clutch mechanism 226 is interposed between the focusing ring interlocking gear 225 and the driving shaft 227, so that the second clutch mechanism 226 forms and cuts off the state of connection between the two members. Here, the driving shaft 227 is constructed in such a way that it receives the rotation of the AF joint shaft 229 by way of a gear train 228. As generally known, the AF joint shaft 229 is driven to perform its rotating motion by an AF driving power source, in an AF mechanism arranged at the camera body side. The rotation thus produced is transmitted to the driving shaft 227.

In the sixth example of a preferred embodiment, the second clutch mechanism 226, which is fixed at the top end of the driving shaft 227, is comprised of a convex clutch member 218A formed approximately in the shape of a cross and a concave clutch part 218B, which is formed into a cross-shaped convex part capable of engaging with the convex clutch member 218A. Both of the convex clutch member 218A and the concave clutch part 218B are formed of material excellent in resistance to wear. The focusing ring interlocking gear 225 is constantly pressed with a compressing spring 230 so as to move forward along a line in the direction of the optical axis, i.e., in the direction in which the concave clutch part 218B is to be engaged with the convex clutch member 218A.

In the same manner as in the first example of a preferred embodiment, as described above, the stationary ring 10 supports thereon an AF-MF changeover ring 31 in a manner as to be permitted to make free linear movement forward and backward in the direction of the optical axis, and to rotate freely round the optical axis. However, a tapered diameter part 233 and an annular V-shaped groove 234 are formed, as set in correspondence with the AF position and the MF position, on the inner circumferential surface of the AF-MF changeover ring 31. In the meantime, the stationary ring 10 is provided with click balls 235, which are set into either one of the tapered diameter part 233 and the annular V-shaped groove 234, and a plate spring, which applies pressing force to these click balls 235 towards the inner circumferential surface of the AF-MF changeover ring 31.

A first clutch mechanism 43, which is substantially identical with that used in the first example of a preferred embodiment, as described above, is provided between the AF-MF changeover ring 31 and the focusing ring 15. In further detail, a smaller diameter part 44, a tapered diameter part 233, and a larger diameter part 46 are formed in the stated order from a forward position along a line in the direction of the optical axis on the inner circumferential surface in the front area of the AF-MF changeover ring 31. In the meantime, the focusing ring 15 is provided with clutch pin holes 47 formed in a plural number at intervals along a line in the direction of the circumference and also extending in the direction of the radius. A clutch pin 48, which is to be put into selective engagement with the smaller diameter part 44, the taper diameter part 233, or the larger diameter part 46, is set in such a manner as to slide freely along a line in the direction of the radius. Each clutch pin 48 is urged by a plate spring 50 for outward movement, that is, towards the side of the AF-MF changeover ring 31. The plate spring 50 is fixed with one end thereof fixed with a fixing screw 251 on the inner circumferential surface of the focusing ring 15. On the stationary ring 10, a through groove 238, extending in the direction of the circumference, is formed to permit the passage and movement of the clutch pin 48.

Also, an annular groove 252 if formed on the inner circumferential surface of the AF-MF changeover ring 31. A roller 254, fixed on the clutch member 253 and having a central axis line extending along a line in the direction of the radius, is fitted in this annular groove 252. The clutch member 253 is provided with a forked part 256, which, being supported on the inner surface of the stationary ring 10 in such a manner as to be capable of moving in the direction parallel with the optical axis, engages an engaging flange formed in a unified structure on the focusing ring interlocking gear 225. Along with the forward or backward movement of the AF-MF changeover ring 31, the clutch member 253 moves in the same direction and, by means of its forked part 256, moves the focusing ring interlocking gear 225 forward or backward in the axial direction.

That is to say, the clutch member 253 will not apply force to the engaging flange 255 of the focusing ring interlocking gear 225, when the AF-MF changeover ring 31 is in the AF position in a forward area. The focusing ring interlocking gear 225 moves forward, as it is subjected to the force exerted by the compressing spring 230, and the concave clutch part 218B gets into engagement with the convex clutch member 218A. When the AF-MF changeover ring 31 moves into the MF position in a rearward area, in contrast with the case just described, the clutch member 253 pushes the focusing ring interlocking gear 225 in counteraction with the force exerted by the compressing spring 230, thereby putting the concave clutch part 218B and the convex clutch member 218A out of engagement with each other. Even in the MF state, the internal gear 24 and the focusing ring interlocking gear 225 will not be released from mutual engagement.

Figure 30:
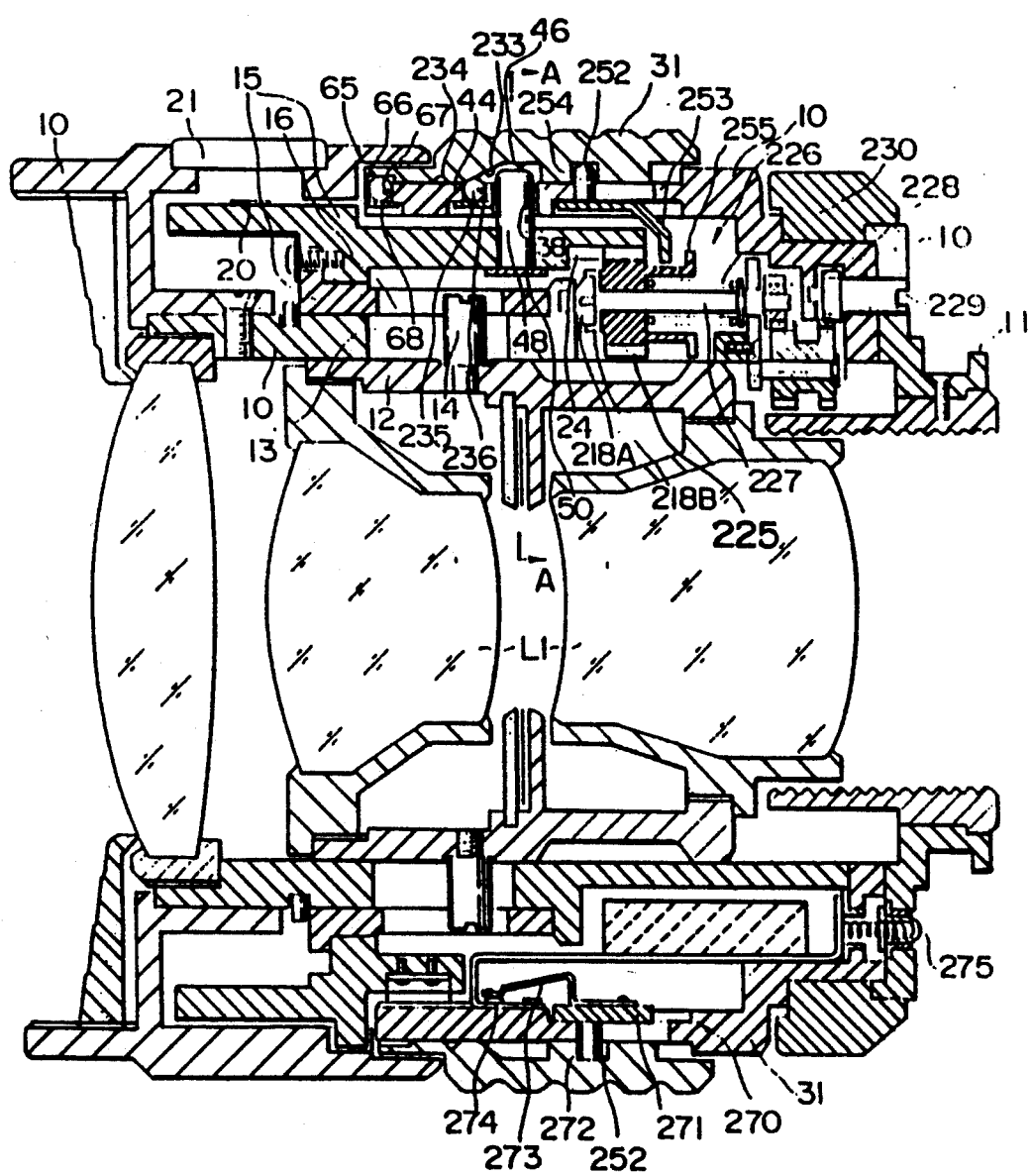
FIG. 30 is an upper-half vertical sectional view illustrating the state of the AF mode of the lens barrel which has been constructed, for use with an automatic focusing camera, as described in the sixth example of a preferred embodiment of the present invention.
Figure 31:
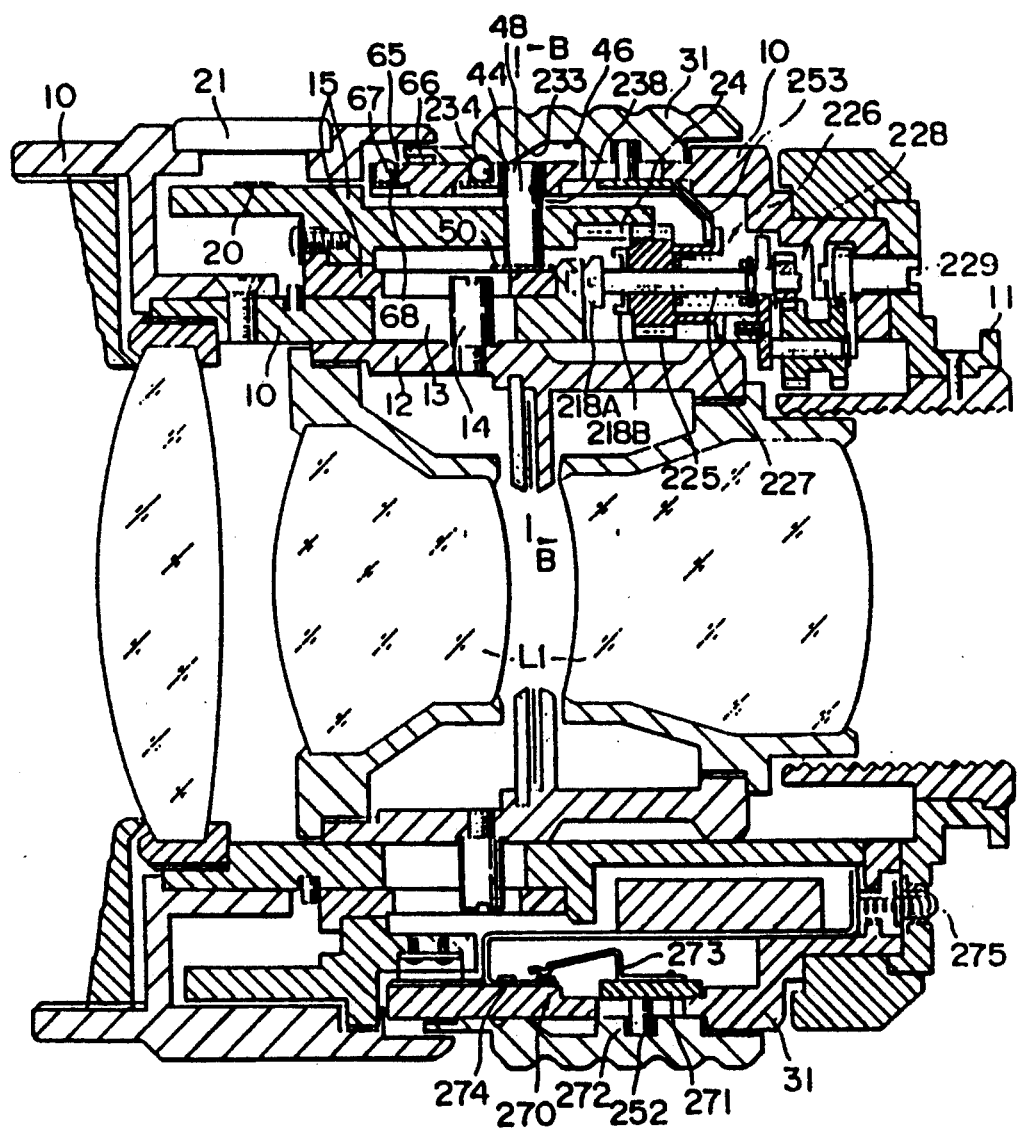
FIG. 31 is an upper-half vertical sectional view illustrating the state of the MF mode of the lens barrel which has been constructed, for use with an automatic focusing camera, as described in the sixth example of a preferred embodiment of the present invention.
Figure 36:
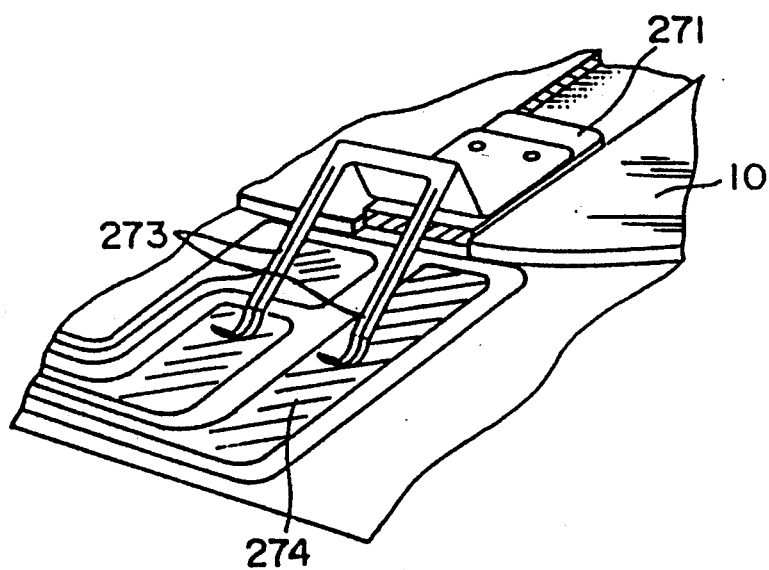
FIG. 36 is a perspective view illustrating the switching mechanism, as shown in FIG. 30, as set in a state in the AF mode.
Figure 35:
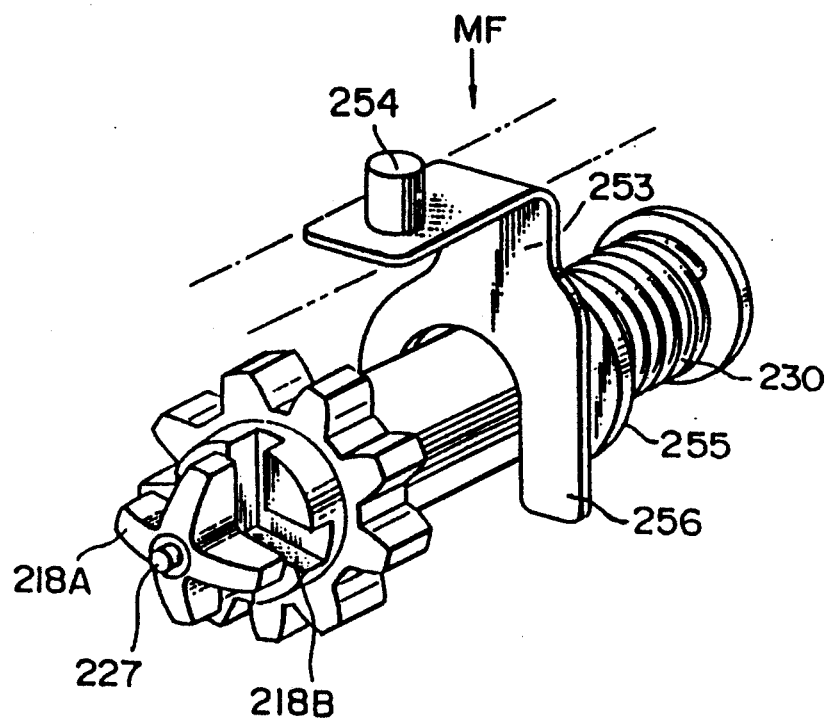
FIG. 35 is a perspective view illustrating the second clutch mechanism, as shown in FIG. 30 as set in a state in the MF mode.
Figure 37:
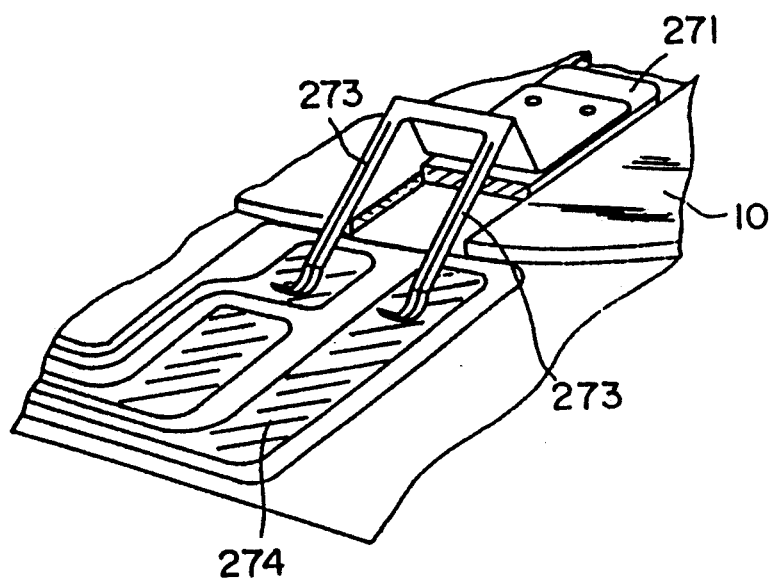
FIG. 37 is a perspective view illustrating the switching mechanism, as shown in FIG. 30, as set in a state in the MF mode.

Also, between the AF-MF changeover ring 31 and the stationary ring 10, a switch mechanism 270, which detects the AF position and MF position of the AF-MF changeover ring 31, is provided as shown in the lower areas in FIG. 30 and FIG. 31, and as shown also in FIG. 36 and FIG. 37. The switch mechanism 270 is comprised of a switch plate 271, which is supported on the stationary ring 10 in such a manner as to be permitted to slide in the direction parallel with the optical axis, a roller 272, which, being installed on the switch plate 271, is set in an annular groove 252 formed on the AF-MF changeover ring 31, and a switch contact piece 273 and a base plate 274, which, being respectively provided on the switch plate 271 and the stationary ring 10, come into contact with each other. With the switch mechanism 270 constructed in this manner, the movement of the AF-MF changeover ring 31 to the AF position or to the MF position will be detected, upon its occurrence, on the basis of a change in the position of contact between the switch contact piece 273 and the base plate 274, and a signal which indicates that the AF-MF changeover ring 31 is in the AF position or in the MF position. The signal will thereupon be transmitted via a signal transmission pin 275 to a control block arranged inside the camera body.

Figure 32:
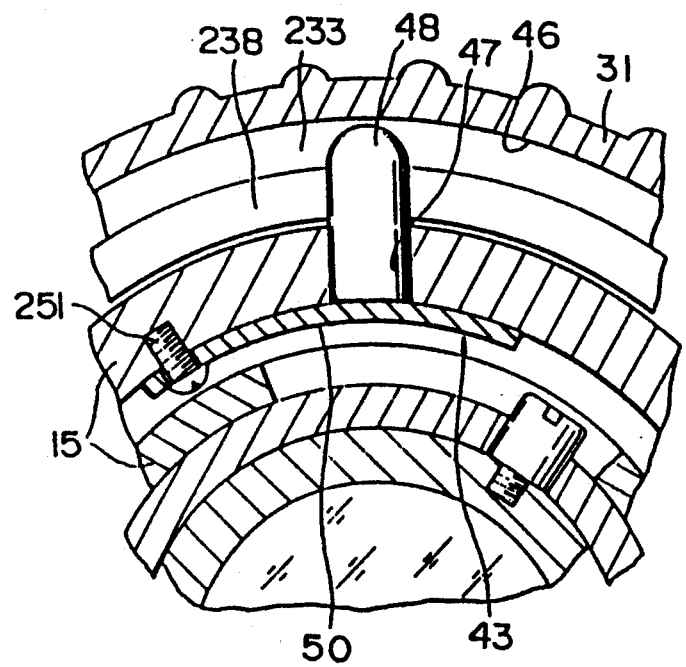
FIG. 32 is a sectional view illustrating the first clutch mechanism in a state set in the AF mode, as shown in FIG. 30, in the construction as taken along the line A—A indicated in FIG. 30.
Figure 33:
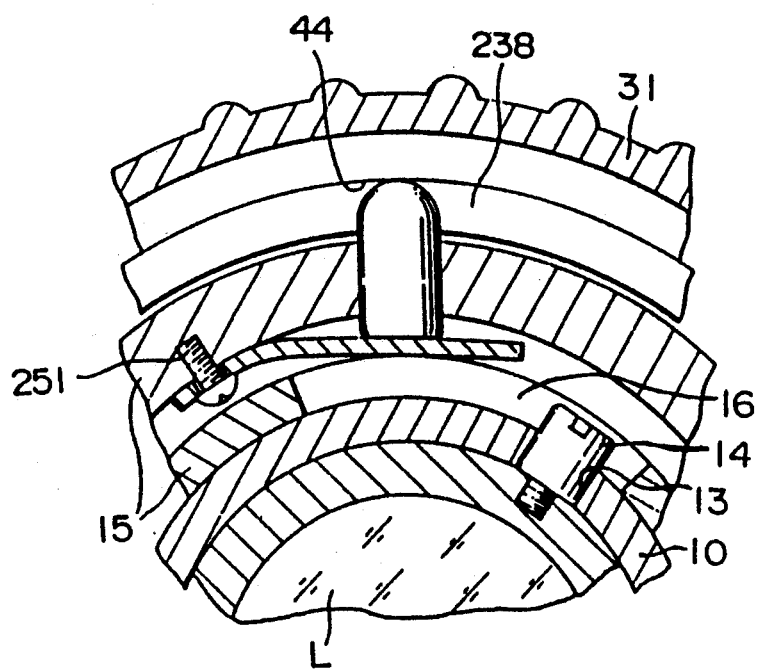
FIG. 33 is a sectional view, illustrating the first clutch mechanism in a state set in the MF mode, as shown in FIG. 31, as taken along the line B—B shown in FIG. 31.
Figure 34:
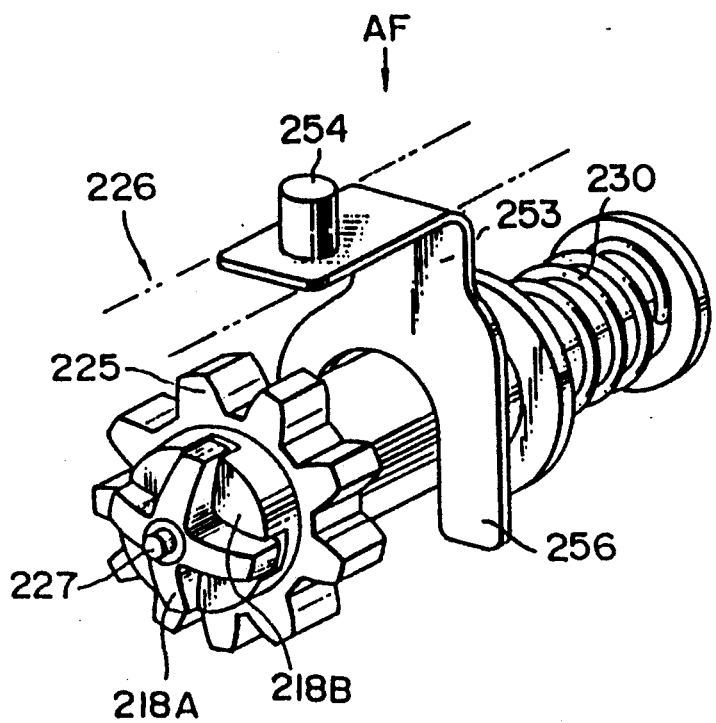
FIG. 34 is a perspective view illustrating the second clutch mechanism, as shown in FIG. 30, as set in a state in the AF mode.

The lens barrel, formed in a construction as described above in the sixth example of a preferred embodiment of the present invention, operates in the manner described in the following part. In the state of the lens barrel set in the AF mode, with the AF-MF changeover ring 31 moved forward, as shown in FIG. 30, a first clutch mechanism 43 releases the AF-MF changeover ring 31 and the focusing ring 15 from their relation in which they rotate together in one unified structure. A second clutch mechanism 226 permits the concave clutch part 218B of a focusing ring interlocking gear 225 to get into engagement with the convex clutch member 218A of the driving shaft 227. The locking mechanism 65 locks up the AF-MF changeover ring 31 on the stationary ring 10. In other words, the top end of the clutch pin 48, which is supported on the focusing ring 15, is in the position of a larger diameter part 46 on the inner surface of the AF-MF changeover ring 31, as shown in FIG. 32. The top end of the clutch pin 48 is kept in a state in which it is not in any contact with the AF-MF changeover ring 31, and, in the meantime, the concave clutch part 218B of the focusing ring interlocking gear 225, which is urged forward by the compressing spring 230, is set in engagement with the convex clutch member 218A of the driving shaft 227.

When the AF joint shaft 229 is rotated by an AF shaft at the camera body side, while the lens body is thus in the state in the AF mode, then the rotation of the AF joint shaft 229 is transmitted to the focusing ring 15 by way of a gear train 228, the driving shaft 227, and the concave clutch part 218B. The convex clutch member 218A, the focusing ring interlocking gear 225, and the internal gear 24 are working in the stated order. An automatic focusing (AF) operation is performed accordingly. At this time, the lock ball 67 is fitted in one of the locking grooves 66 on the AF-MF changeover ring 31. Even if the lock ball 67 fails to be set in the locking groove 66, a state of engagement can be attained by rotating the AF-MF changeover ring 31 by a small degree in either direction. Therefore, the AF-MF changeover ring 31 will not rotate in the AF state. Thus, the lens barrel described here will not be liable to cause any awkward sensation and inconvenience in operation, which will otherwise result from the inadvertent rotation of the AF-MF changeover ring 31, which is defined as a grip part by which the photographer holds the lens barrel by hand.

However, when the lens barrel is set in the MF mode, in contrast to the state described above, with the AF-MF changeover ring 31 moved backward, as shown in FIG. 31, then the first clutch mechanism 43 sets the AF-MF changeover ring 31 and the focusing ring 15 into engagement with each other. The second clutch mechanism 226 moves the focusing ring interlocking gear 225 backward, thereby releasing the concave clutch part 218B and the convex clutch member 218A from their mutual engagement. The locking mechanism 65 cancels the lock on the AF-MF changeover ring 31. That is to say, the top end of the clutch pin 48, which is supported on the focusing ring 15, gets into strong frictional contact with the smaller diameter part 44 on the inner surface of the AF-MF changeover ring 31, thereby putting the AF-MF changeover ring 31 and the focusing ring 15 into a unified structure.

In the meantime, the forked part 256 of the clutch member 253 pushes the focusing ring interlocking gear 225 backward, along with the backward movement of the AF-MF changeover ring 31, and thereby releases the concave clutch part 218B and the convex clutch member 218A from engagement. Also, the lock ball 67 moves out of the locking groove 66. In this state, the AF-MF changeover ring 31 is set in a freely rotatable state. When the AF-MF changeover ring 31 is manually rotated, the rotation will be transmitted to the focusing ring 15 by way of the smaller diameter part 44, the clutch pin 48, and the clutch pin hole 47 working in the stated order for the transmission of the rotation. An MF operation is thus performed.

In the state of the lens barrel thus set in the MF mode, the AF shaft at the camera body side will not go into any rotation, by the effect of an MF signal which is given it via the switch mechanism 270 and a signal transmission pin 275. As a result, the AF joint shaft 229 will not be set into rotation. In addition, the rotation of the AF joint shaft 229 will not be transmitted, granting that such a rotation occurs, because the concave clutch part 218B and the convex clutch member 218A are then released from engagement. The position of the AF-MF changeover ring 31 in an axial direction is limited by the engagement of the click ball 235 with the annular V-shaped grooves 234.

The sixth example of a preferred embodiment given above has a driving shaft 227, arranged in a fixed position in the direction of the optical axis, while the focusing ring interlocking gear 225 is set so as to be capable of moving along a line in the direction of the optical axis. In terms of the mutual relation between the focusing ring interlocking gear 225 and the driving shaft 227, which are provided coaxially, it is feasible to form a lens barrel in a construction formed, on the contrary, with a focusing ring interlocking gear 225 provided in a position fixed in the direction of the optical axis while the driving shaft 227, namely, the convex clutch member 218A, is set in a manner permitting it to move along a line in the direction of the optical axis. In this case, a clutch member 253 may be employed in a construction in which it is operated to move the driving shaft 227 (namely, the convex clutch member 218A).

Next, with reference to FIG. 38 through FIG. 44 of the accompanying drawings, a detailed description will be given below with respect to a seventh example of a preferred embodiment of a lens barrel constructed in accordance with the present invention for use thereof for an automatic focusing camera. In this regard, those parts in the example which are identical to those already described in the first example of a preferred embodiment given above are indicated with the same reference marks, and their description is omitted from the seventh example of an embodiment.

First, a focusing ring 15 is provided with an interlocking pin 318 fixed thereon and projecting in the direction of the radius. In the meanwhile, an intermediate ring 319 is fitted, in such a manner as to rotate freely round the optical axis, on the inner circumferential surface of the stationary ring 10, and an interlocking arm 320 is fixed on the intermediate ring 319 by means of a fixing screw 321. The interlocking arm 320 sets into engagement with the interlocking pin 318, thereby unifying the intermediate ring 319 and the focusing ring 15 into one structure for movement in the direction of rotation. That is to say, the intermediate ring 319 and the focusing ring 15 will always rotate together in one unified body.

A first clutch mechanism 343, which is shown in FIG. 38, FIG. 39, FIG. 42, and FIG. 43, is provided between the AF-MF changeover ring 31 and the intermediate ring 319. The first clutch mechanism 343 is constructed in such a way that it permits the intermediate ring 319 to rotate freely in relation to the AF-MF changeover ring 31, when the AF-MF changeover ring 31 is in the AF position in a forward area, the AF-MF changeover ring 31 and the intermediate ring are set into one unified structure when the AF-MF changeover ring 31 is in the MF position in a rearward area. In the meantime, the intermediate ring 319 has a plural number of clutch pin holes 347 formed therein, in the direction of the radius in positions different in the circumferential direction. In each of the clutch pin holes 347, a clutch pin 348, which is selectively set into engagement with the smaller diameter part 44, the tapered diameter part 45, or the larger diameter part 46, is fitted in such a way as to slide freely. Each clutch pin 348 has an outward projecting end restricted by a fall-off preventing head part and drives outward movement by a plate spring 350. The plate spring 350 is fixed at one end thereof on the intermediate ring 319 with a fixing screw 338.

The AF-MF changeover ring 31 has stopper areas 339 and 340 formed on the forward and rearward end surfaces thereof. The stationary ring 10 is provided with moving range restricting walls 341 and 342, which get into respective contact with the stopper areas 339 and 340 and thereby restrict the ranges for the forward and rearward movement of the stationary ring 10. Then, each of the stopper areas 339 and 340 is provided with a buffer elastic member 330, which offers a buffer elastic effect at the time of collision of the respective stopper areas with the moving range restricting walls 341 and 342.

On the inner circumference side of the AF-MF changeover ring 31, a transmitting ring 324 is provided as set on the inner circumferential surface of the intermediate ring 319. This transmitting ring 324 has an annular groove 325 on the surface of its outer circumference. A roller 326, which is fixed on the AF-MF changeover ring 31 and has a central axial line extending along a line in the direction of the radius, is set in the annular groove 325. When the AF-MF changeover ring 31 moves forward or backward along a line in the direction of the optical axis, the transmitting ring 324 moves in a structure unified therewith forward or backward along a line in the direction of the optical axis.

In the seventh example of a preferred embodiment, the second clutch mechanism 353 is provided with a clutch ring 328, which is set in a manner permitting free movement along a line in the direction of the optical axis, in the rear area of the transmitting ring 324. A clutch gear 327 is formed on the inner circumferential surface of the clutch ring 328. The clutch ring 328 is constantly pushed forward by a plate spring 329.

Figure 40:
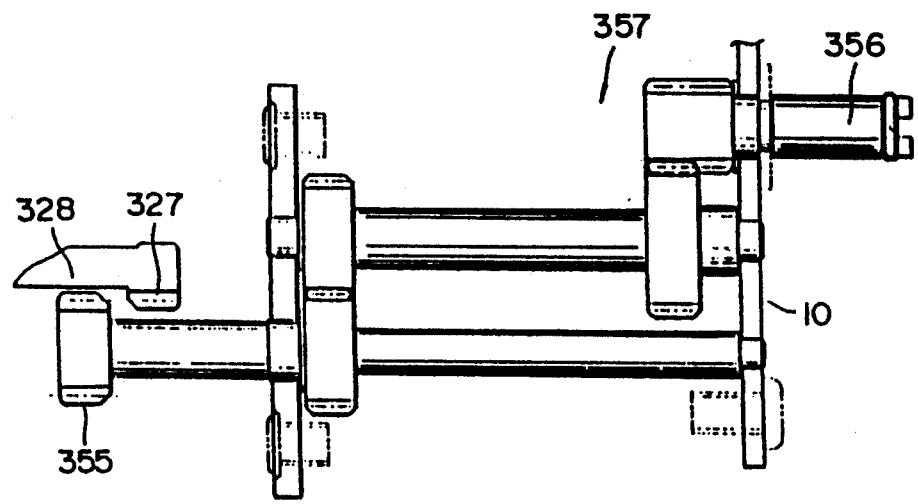
FIG. 40 is a plane view illustrating the relative relation between the clutch gear and the AF gear at the side of the AF mechanism.
Figure 41:
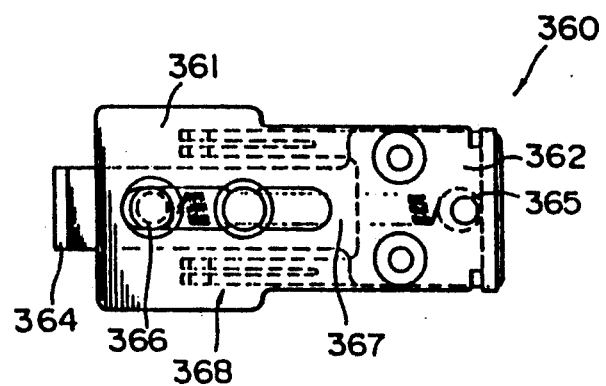
FIG. 41 is a plane view illustrating the construction of the switching mechanism.
Figure 42:
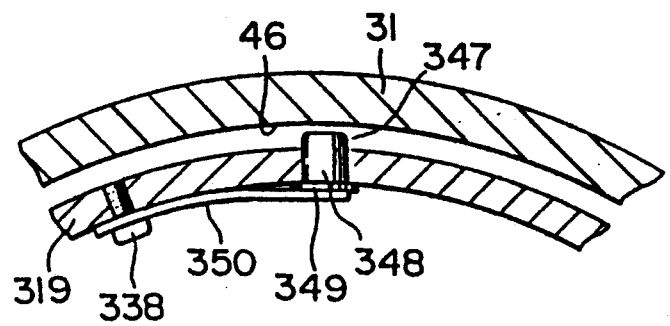
FIG. 42 is a sectional view illustrating the first clutch mechanism in a state of being set in the AF mode, as taken along the line A—A, as shown in FIG. 38.
Figure 43:
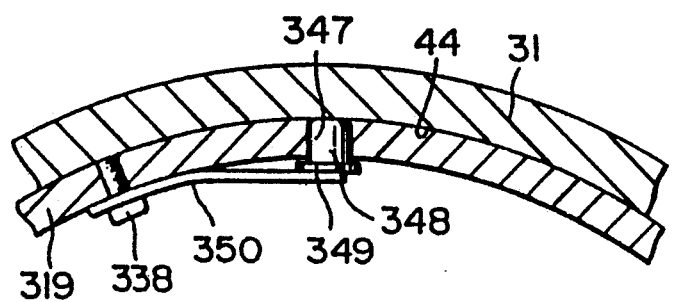
FIG. 43 is a sectional view illustrating the first clutch mechanism in a state of being set in the MF mode, as taken along the line B—B, as shown in FIG. 39.

The clutch gear 327 is constructed in such a manner that it is set into engagement with an AF gear 355 at the side of the AF mechanism, or is released from engagement therewith, depending on the position of the clutch ring 328 (namely, the AF-M changeover ring 31) in the direction of the optical axis. The AF gear 355 is set into interlocking, via a gear train 357, with an AF joint shaft 356, which is exposed on the rear end of the stationary ring 10, as shown in FIG. 40, and receives force for rotation from the camera body side. Therefore, the AF gear 355 will be driven into rotation in a fixed position in respect of the direction of the optical axis when rotating force is given to the AF joint shaft 356, in the state in which the lens barrel is set in the AF mode.

A switch mechanism 360, which detects the AF position and the MF position of the AF-MF changeover ring 31, is installed in the AF-MF changeover ring 31. The switch mechanism 360 has a stationary base plate 361 and a sliding plate 362, which is arranged on the stationary base plate 361 and supported in a manner permitting sliding movement in the direction parallel with the optical axis. On the forward end part of the sliding plate 362, an engaging bet part 364 is formed for engagement with an inner flange 363 provided at the rear end of the transmitting ring 324. A tension spring 367, which exerts thrusting force to the sliding plate 362 for forward projection, is suspended between the pin 365 set on the sliding plate 362 and a pin 366 set on the AF-MF changeover ring 31.

An AM switch 368 is installed over the stationary base plate 361 and the sliding plate 362. The AM switch 368 is constructed in such a manner that it detects the AF state by the movement of the sliding plate to a forward position accordingly, as it is pulled by the tension spring 367. It detects the MF state by the movement of the sliding plate to a rearward position in resistance to the tension spring 367. The switch mechanism 360, or specifically the AM switch 368, operates in accordance with the position to which the AF-MF changeover ring 31 is moved, and thus without any regard to the relation between the clutch gear 327 and the AF gear 355 that are in engagement.

Figure 38:
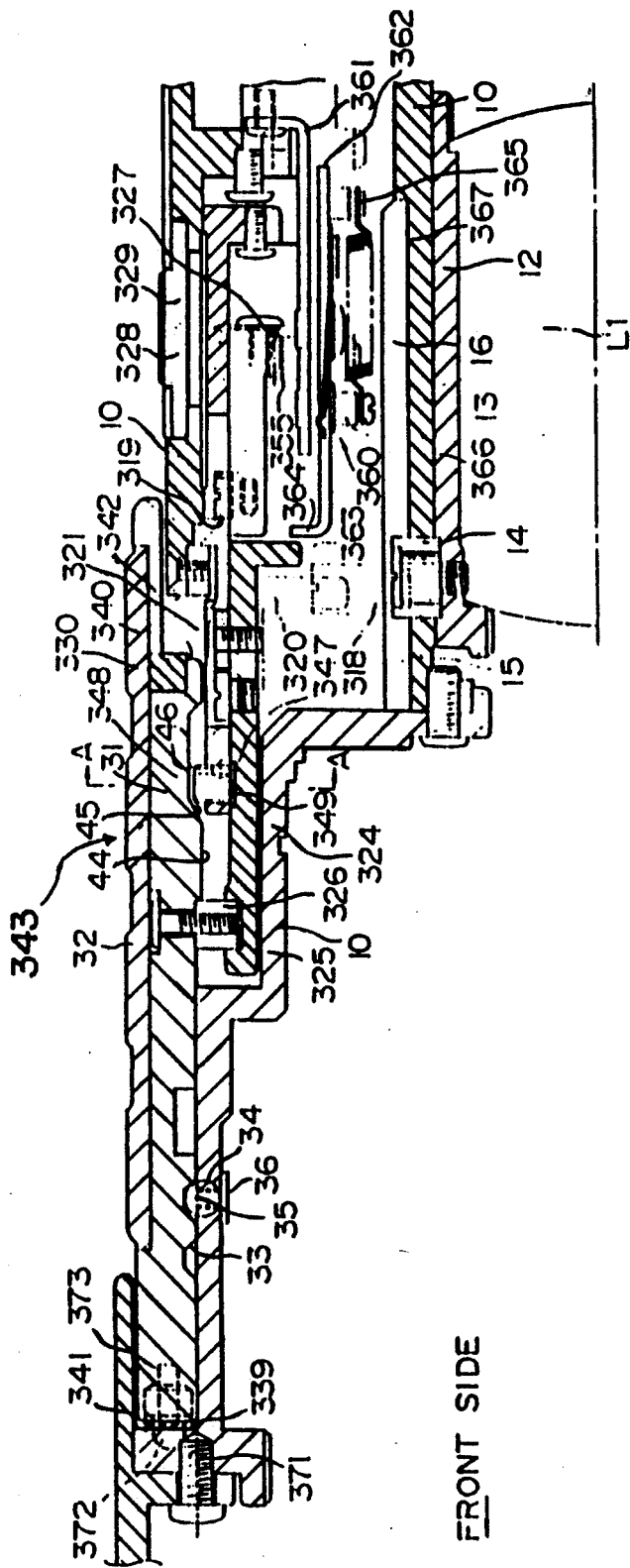
FIG. 38 is an upper-half vertical sectional view illustrating the state of the A mode of the lens barrel which has been constructed, for use with an automatic focusing camera, as described in the seventh example of a preferred embodiment of the present invention.
Figure 39:
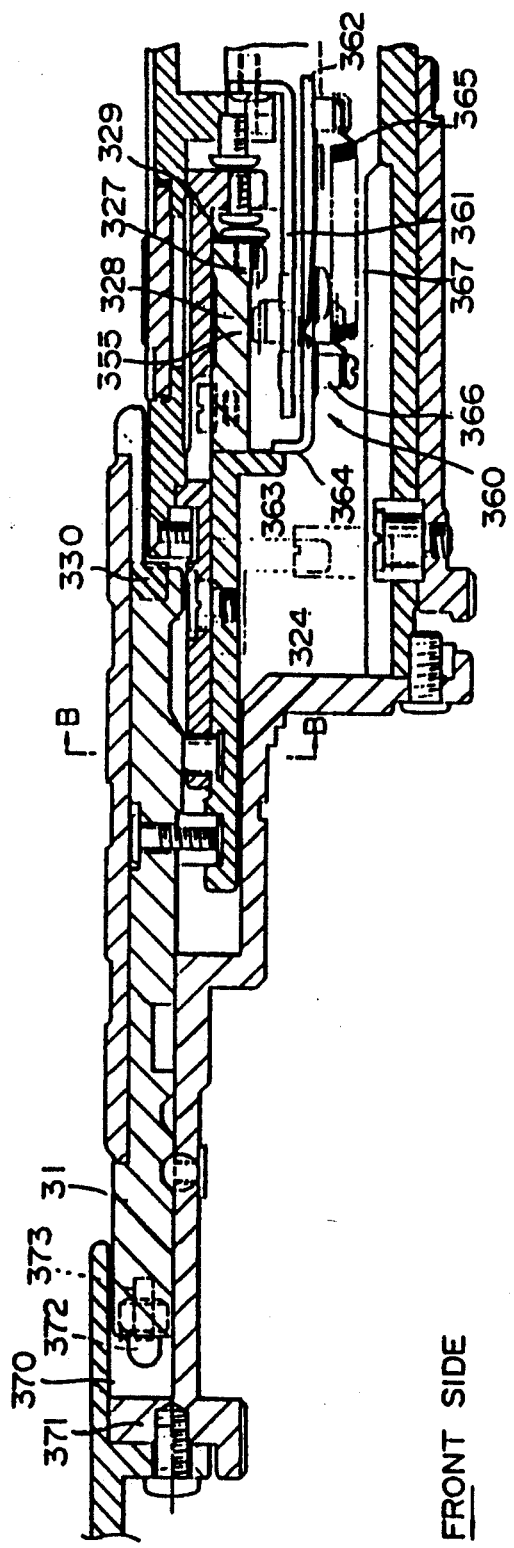
FIG. 39 is an upper-half vertical sectional view illustrating the state of the MF mode of the lens barrel which has been constructed, for use with an automatic focusing camera, as described in the seventh example of a preferred embodiment of the present invention.

A lock mechanism 370, which locks the AF-MF changeover ring 31, when it is moved to the AF position, is installed between the forward end of the AF-MF changeover ring 31 and the stationary ring 10. The lock mechanism 370 is provided, as shown in FIG. 38 and FIG. 39, with a plural number of locking grooves 371 formed at appropriate angular intervals on the stationary ring 10. Locking plus 372 are set into the individual locking grooves 371 when the AF-MF changeover ring 31 is in the AF position. Urging springs 373 apply force to the individual locking plus 372.

The lens barrel which is constructed in the manner described above in the seventh example of a preferred embodiment operates in the manner, as described below.

As shown in FIG. 38, the forward end of the clutch pin 348, supported on the intermediate ring 319, is in the position of the larger diameter part 46 on the inner circumferential surface of the AF-MF changeover ring 31, maintaining no contact with the AF-MF changeover ring 31, when the lens barrel is set in the AF mode, with the AF-MF changeover ring 31 moved to a forward area. On the other hand, the clutch gear 327 of the clutch ring 328, as thrust forward by the plate spring 329, is in engagement with the AF gear 355. In this state, the rotation to which the AF joint shaft 356 is set, by the driving power source provided at the camera body side, is transmitted to the focusing ring 15 by way of the AF gear 355, the clutch ring 328, the intermediate ring 319, the interlocking arm 320, and the interlocking pin 318, working in the stated order. As a result, an AF operation is performed. At this moment, the locking pin 372 of the AF-MF changeover ring 31 is set in one of the locking grooves 371 on the stationary ring 10. Even if the locking pin 372 happens to fail to set into the locking groove 371, the ring will soon be put into a state of engagement with the locking groove 371 by a rotation of the AF-MF changeover ring 31 by a slight angular degree in either direction. Therefore, the lens barrel constructed according to the present invention in the manner described in this example of a preferred embodiment will not be liable to any rotation of the AF-MF changeover ring 31 in the AF state and is therefore not subject to any awkward and inconvenient feeling which otherwise tends to be caused to occur in its use as the result of the inadvertent rotation of the grip part.

Also, in this state of the lens barrel, thus set in the AF mode, the transmission ring 324 is moved to a forward area, and an inward flange 363 has released the engaging bent part 364 of the sliding plate 362. For this reason, the sliding plate 362 of the switch mechanism 36 slides forward by the action of the tension spring 367, so that the AM switch 368 detects the AF state.

However, when the lens barrel is set in the MF state, with the AF-MF changeover ring 31 moved to a rearward area, as shown in FIG. 39, in contrast to the state described above, then the forward end of the clutch pin 348, supported on the intermediate ring 319, gets into strong frictional contact with the smaller diameter part 344 of the AF-MF changeover ring 31, thereby putting the AF-MF changeover ring 31 and the intermediate ring 319 into a unified structure. On the other hand, the transmission ring 324 moves rearward along with the movement of the AF-MF changeover ring 31 to a rearward area, thereby pushing the clutch ring 328 and releasing the clutch gear 327 and the AF gear 355 from engagement. Moreover, the locking pin 372 comes out of the locking groove 371, thereby releasing the AF-MF changeover ring 31 from a locking position.

When the AF-MF changeover ring 31 is rotated by manual operation while this state is maintained, rotation is transmitted to the intermediate ring 319 by way of the smaller diameter part 344, the clutch pin 348, and the clutch pin hole 347 working in the stated order. The rotation of the AF-MF changeover ring 31 is then transmitted further to the focusing ring 15 via the interlocking arm 320 and the interlocking pin 318 working in the stated order. Therefore, an MF operation can be performed.

In the state of the lens barrel thus set in the MF mode, the inward flange 363 of the transmission ring 324 pushes the engaging bent part 364 and thereby sets the sliding plate 362 into sliding motion in the rearward direction in resistance to the tension spring 367. The AM switch 368 in the switch mechanism 360 thereby detects the state of the lens barrel set in the MF mode and transmits a signal indicating the mode thus detected to the body side. As the result of this operation, rotating force is not given from the camera body side to the AF joint shaft 356. Moreover, even if any rotation is given to the AF joint shaft 356, such rotation will not be transmitted to the clutch gear 327 because the AF gear 355 and the clutch gear 327 are not engaged with each other.

Figure 44:
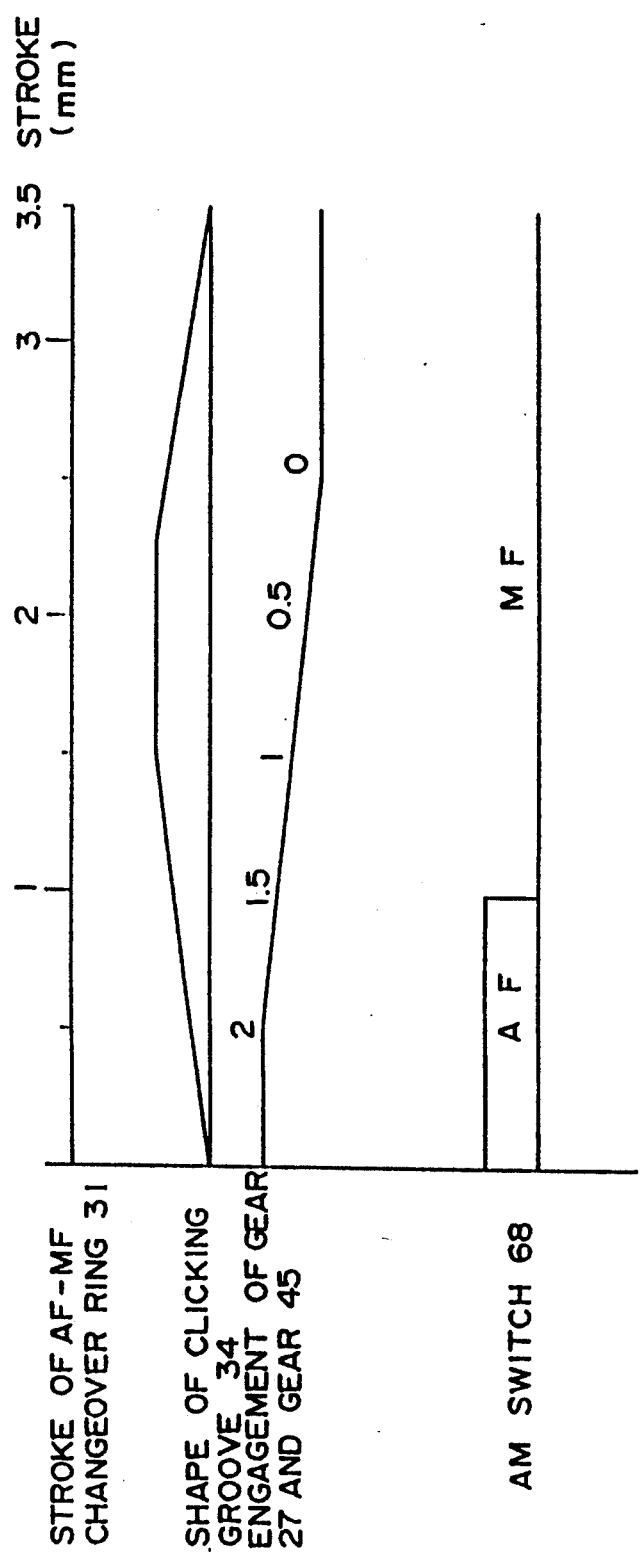
FIG. 44 is an explanatory view illustrating the moving stroke of the AF-MF changeover ring for a lens barrel, s shown in FIG. 38, and the operating states of the parts related to the AF-MF changeover ring.

As shown in FIG. 44, the detection of the state of the AF mode and that of the MF mode by means of the AM switch 368 is performed in particular stroke positions on the AF-MF changeover ring 31, without any dependence on the state of engagement of the clutch gear 327 with the AF gear 355, in the seventh example of a preferred embodiment. Therefore, a signal indicating a completed shift to the AF state will be given with unfailing certainty to the body side, even if the engagement of the clutch gear 327 and the AF gear 355 is incomplete at the time of a changeover between the AF state and the MF state by means of the AF-MF changeover ring 31 and particularly at the time of a changeover ring from the MF state to the AF state. Accordingly, the AF gear 355 will be rotated by means, of the AF joint shaft 356. The AF gear 355 will be put into engagement with the clutch gear 327, which is pushed to a point in the forward area by the plate spring 329, when the AF gear 355 has rotated by a slight angular degree, so that the lens barrel will be able to effect an unfailing shift to the AF state.

Next, the reference to FIG. 45 through FIG. 51 in the accompanying drawings, an eighth example of a preferred embodiment of the lens barrel, constructed in accordance with the present invention for use thereof with an automatic focusing camera, will be described below in respect of a case in which the present invention is applied to the lens barrel for an interchangeable lens.

A lens barrel 410, constructed for use with an interchangeable lens as described in the eighth example of a preferred embodiment, is in a twin group type construction comprised of a front group lens L1 and a rear group lens L2. The focusing operation is performed by moving the rear group lens L2 for positional adjustment in the direction of the optical axis. The front group lens L1 is set solidly in a stationary lens barrel 412 which is provided, at its rear end part, with a connecting mount 411 for connection with the camera body. The stationary lens barrel 412 has an AF-MF changeover ring 413 set on the outer circumference in the front side in such a manner as to permit movement in the direction of the optical axis. The stationary lens barrel 412 has a calibrated distance scale ring (focusing ring) 414 supported on the inner circumference of a rear part, in such a way that the AF-MF changeover ring 413 may rotate freely. The AF-MF changeover ring 413 works also as a manual focusing ring when it is moved to the MF position. Also, the stationary lens barrel 412 has an inside stationary cylinder 412a, with a leading ring 415 set for free rotation on the outer circumference of the inside stationary cylinder 412a, and with a moving lens barrel 416 fitted on the inner circumference. The calibrated distance scale ring 414 and the leading ring 415 is connected by a connecting member 417 and will always rotate equally. A calibrated distance scale, not shown in the drawings, is fixed on the outer circumference of the calibrated distance scale ring 414. This calibrated distance scale can be read through a calibrated distance scale window provided on the stationary lens barrel 412, and similarly not shown in the drawings.

A linear movement guide groove 419, formed in the direction parallel with the optical axis, is made on the inside stationary cylinder 412a. The leading ring 415 has a leading groove 420 formed on it. The pins 422 formed in the direction of the radius on the moving lens barrel 416 are inserted in the linear movement guide groove 419 and the leading groove 420, so that the moving lens barrel 416 moves straight in the direction of the optical axis as guided along the linear movement guide groove 419 and along the leading groove 420 when the leading ring 415 rotates. The moving lens barrel 416 has the rear group lens L2 and a diaphragm block 418 supported therein. The rear group lens L2 will therefore move in the direction of the optical axis, and a focusing operation is thereby performed, when the leading ring 415, that is, the calibrated distance scale ring 414, is driven for rotating motion.

The AF mechanism is a mechanism for driving the calibrated distance scale ring 414 into rotation with an electric motor, and a lens driving inner gear centering around the optical axis (an optical axis centered gear) 423 is formed on the inner circumference the calibrated distance scale ring 414. In the meantime, a joint gear 425 is supported, in such a way as to rotate freely, on a connecting amount 411 and a shaft bearing plate 424. The joint gear 425 is connected by a joint part 425a formed at the rear end thereof, with a joint gear installed inside the camera body, and has a gear 425b at its front end part. The gear 425b is set in engagement with a gear 427 supported on the shaft bearing plates 424 and 426. A small gear 427a, which is formed in one body and on the same axis with the gear 427, is in constant meshing with a driving clutch gear 429, which is in one unified structure at least in the axial direction with a changeover shaft 428. That is, the driving clutch gear 429 will surely be set into rotation when it is given driving force from the camera body side, by way of the joint gear 425.

Figure 49:
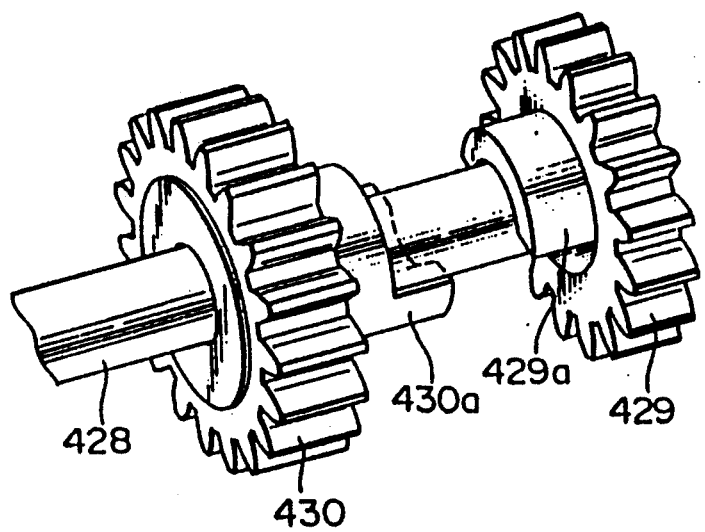
FIG. 49 is a perspective view illustrating the configuration of the clutch teeth on the driving clutch gear and that of the clutch teeth on the driven clutch gear.
Figure 50:
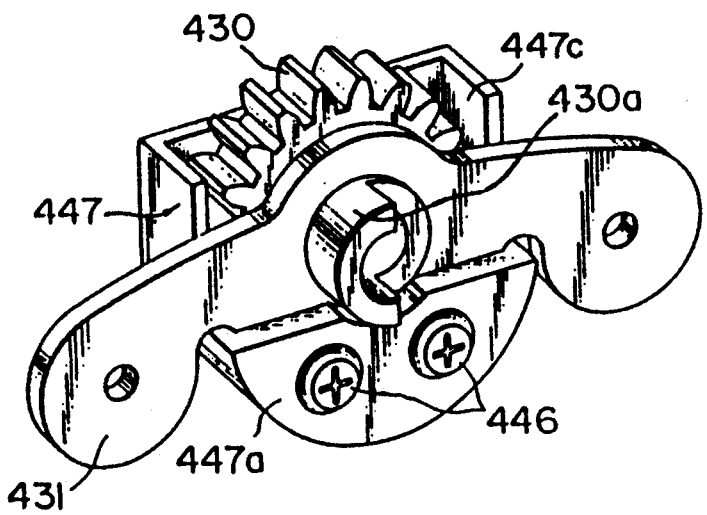
FIG. 50 is a perspective view illustrating the construction of the main part of the oil scatter preventing device, as shown in FIG. 45.
Figure 52:
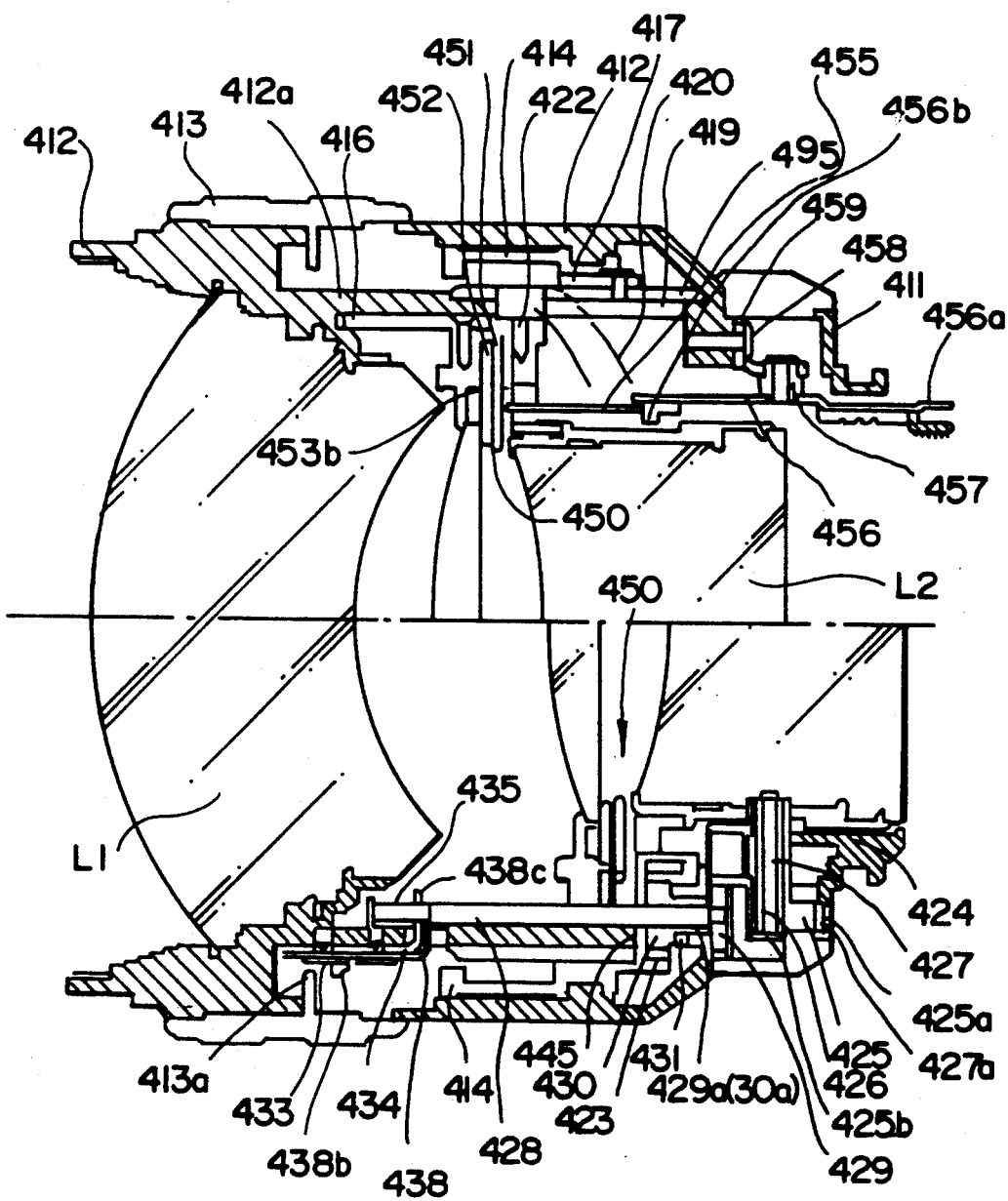
FIG. 52 is a sectional view illustrating the construction of the AF-MF changeover mechanism and the diaphragm block in the eighth example of the preferred embodiment of the present invention.

In the meantime, the changeover shaft 428 has a driven clutch gear 430 set thereon in such a manner as to rotate relatively around the optical axis and to more freely in the direction of the optical axis. The driven clutch gear 430 is supported, so as to rotate freely, with a shaft bearing 431, fixed on the inner surface of the stationary lens barrel 412. The gear 430 meshes with the inner gear 423 of the calibrated distance scale ring 414. Then, the driving clutch gear 429 and the driven clutch gear 430, respectively, have clutch teeth 429a and 430a formed on the surfaces of their opposite ends. The clutch teeth 429a and 430a are in such shape, as shown in FIG. 49, that the driving clutch gear 429 and the driven clutch gear 430 will move in one unified body when the two clutch gears come closer to each other, until both of the clutch teeth 429a and the clutch teeth 430a are put into engagement. All the gears other than the lens driving inner gear 423 are small gears which are located in the periphery of the lens barrel and do not have the optical axis as the center of their rotation.

The top end part of the changeover shaft 428 is supported on a guide plate 434 fixed on the stationary lens barrel 412 by a fixing screw 433. With a compressing coil spring 435 inserted through the changeover shaft 428, as well as a washer 436 and a C-ring 437 fixed on the forward end of the changeover shaft 428, the guide plate 434 is urged for forward movement, namely, in the direction in which the clutch teeth 429a of the driving clutch gear 429 are to be set into engagement with the clutch teeth 430a of the driven clutch gear 430.

An AF-MF detection changeover plate 438 is supported on the guide plate 434. The AF-MF detection changeover plate 438 has an elongated hole 438a, which corresponds to the fixing screw 433 a thrust projection 438b, which is to be engaged with a thrusting projection 413a of the AF-MF changeover ring 413, and an engaging part 438c for engagement with the staged part changing shaft 428a of the changeover shaft 428. This AF-MF detection changeover plate 438 can move in the same direction as the changeover shaft 428. Moreover, the changeover plate 438 is pushed forward for movement with a tension coil spring 439, suspended between it and a guide plate 434. The AF-MF detection changeover plate 438 has a code plate 440 fixed in the stationary lens barrel 412 and a brush 441 which comes into contact with the code plate 440. The code plate 440 detects a shift between an AF operation and a MF operation, as the brush changes the position of contact with the code plate 440, and transmits the information of such a detection to an AF motor control circuit 445, at the camera body side via an FPC board 442, and an information terminal 443 adjacent to a connecting amount 411. The engaging part 438c causes the changeover shaft 428 to move backward together with the AF-MF detection changeover plate 438, when it is pushed backward by the thrusting projection 413a of the AF-MF changeover ring 413.

Clutch mechanism 413c and 414c are provided, respectively, on the opposite end surfaces of the AF-MF changeover-ring 413 and the calibrated distance scale ring 414. The clutch mechanism 413c and 414c are to unify the AF-MF changeover ring 413 and the calibrated distance scale ring 414 into one structure in respect of the direction of the rotation when the AF-MF changeover ring 413 has been moved to the MF position, in a rearward area.

Figure 45:
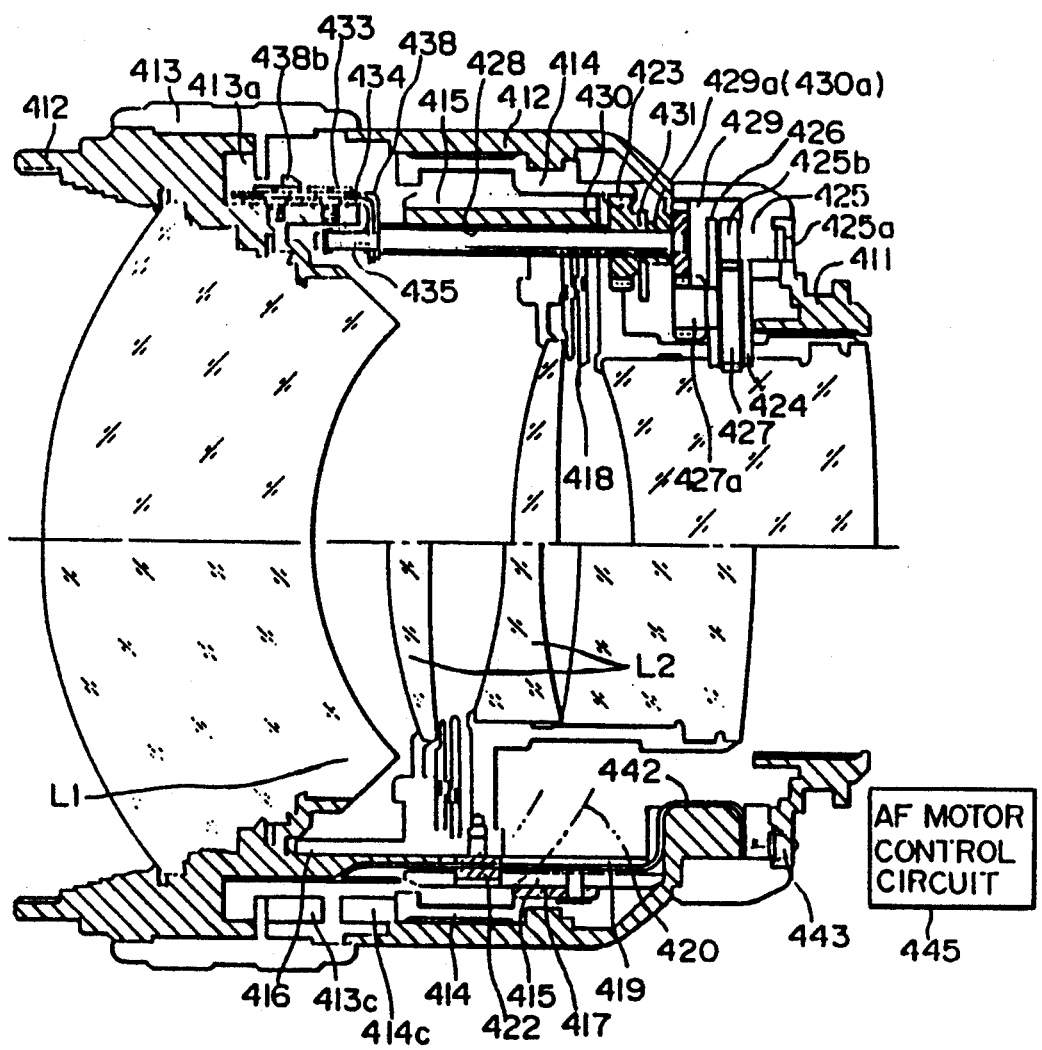
FIG. 45 is a sectional view illustrating the construction of the AF-MF changeover mechanism in the eighth example of a preferred embodiment of the lens barrel, constructed in accordance with the present invention, for use with an automatic focusing camera.
Figure 46:
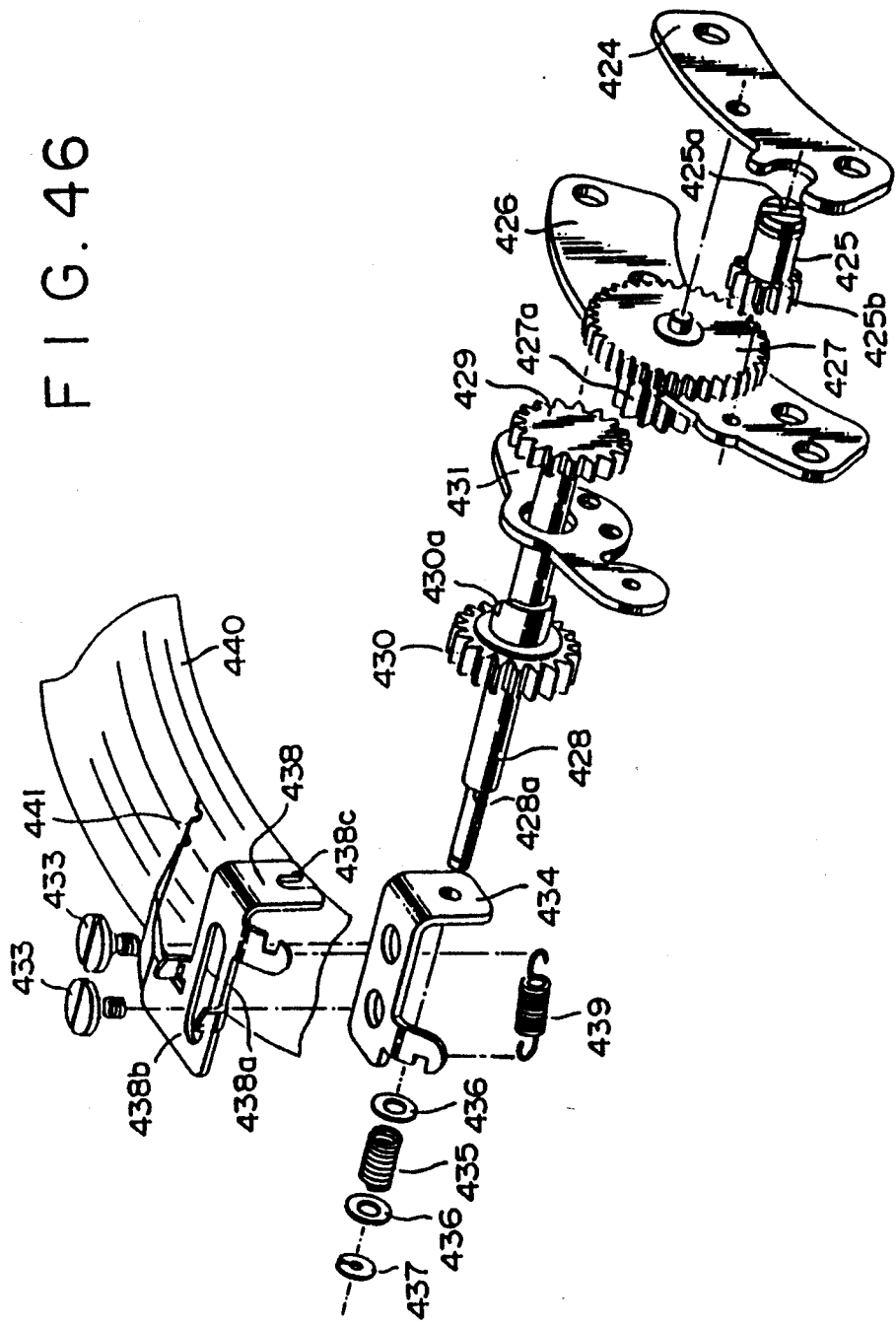
FIG. 46 is a perspective view illustrating the main parts as taken out of the AF-MF changeover mechanism, as shown in FIG. 45.
Figure 47:
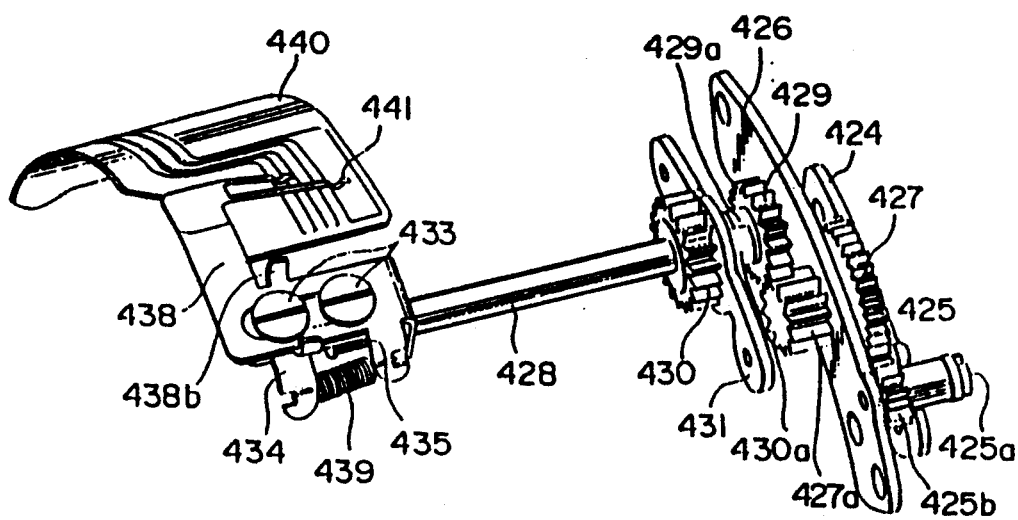
FIG. 47 is a perspective view illustrating the clutch mechanism in a state of being set in the AF mode.
Figure 48:
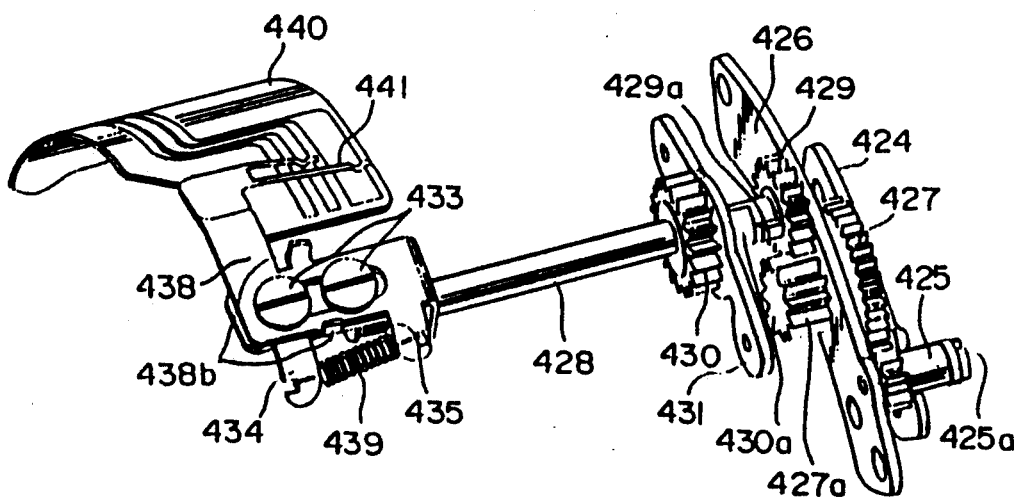
FIG. 48 is a perspective view illustrating the clutch mechanism in a state of being set in the MF mode.

In the lens barrel 410 constructed, for use with an interchangeable lens, in the manner as described above, in the eighth example of a preferred embodiment, the changeover shaft 428 and the driving clutch gear 429 move forward by the pressing force applied by the compressing coil spring 435 in the state of the lens barrel with the AF-MF changeover ring 413 moved to the AF position in a forward area, as shown in FIG. 45. The clutch teeth 429a of the driving clutch gear 429 are thereby set into engagement with the clutch teeth 430a of the driven clutch gear 430. Then, the information, that the AF-MF changeover ring 413 is in the AF position, is detected with the code plate 440 and the brush 441 and conveyed to an AF motor control circuit 445 through an FPC board 442 and an information terminal 443. The AF motor control circuit 445 rotates the joint shaft for a reversal of the positive side and the negative side thereof, in the camera body in accordance with the information on the focal point of the photographed object. The rotation of the joint shaft is transmitted to the joint gear 425. The rotation thus transmitted is transmitted farther to the driven clutch gear 430 via the gear train mechanism mentioned above and still farther from the inner gear 423 to the calibrated distance scale ring 414, the leading ring 415, and the moving lens barrel 416. Therefore, the rear group lens L2 moves in the direction of the optical axis, and an AF operation is performed therewith.

In contrast to this, the thrusting projection 413a pushes the thrust projection 438b, when the AF-MF changeover ring 413 is moved to the MF position in a rearward area. The thrust projection 438b then moves the changeover shaft 428 and the driving clutch gear 429 via an engaging part 438c, thereby releasing the clutch teeth 429a and the clutch teeth 430a from engagement with each other. At the same time, the AF-MF changeover ring 413 is connected by way of the clutch mechanism 413c and 414c with the calibrated distance scale ring 414 for rotation in one unified structure. Therefore, with the rotation of the AF-MF changeover ring 413, an MF operation is performed. The information that the AF-MF changeover ring 413 is in the MF position is detected by the code plate 440 and the brush 441, and is then given to the AF motor control circuit 445 by way of the FPC board 442 and the information terminal 443. In the MF state, the AF motor control circuit 445 does not rotate the joint shaft at the camera body side.

As described above, the construction of the lens barrel described in the eighth example of a preferred embodiment offers a clutch mechanism which, though simple in construction, is capable of operating with a high degree of certainty. It is therefore capable of performing a changeover between an AF operation and an MF operation in a smooth and efficient manner because the lens barrel in which a focusing ring, which moves a focusing lens group in the direction of the optical axis along with its own rotation, is provided with a gear performing operations centering around the optical axis. The lens barrel is further provided with a driving clutch gear rotating with driving force received from a driving power source provided at the camera body side, being arranged in such a manner as to be moved for engagement with, and disengagement from a driven clutch gear to be set in constant engagement with the above-mentioned gear with its operation centering around the optical axis. The driving clutch gear is moved to and away from the driven clutch gear by means of a changeover shaft moving in the direction of the optical axis interlocking with an AF-MF changeover ring 413.

In the meantime, the diaphragm block 418, mentioned above, is constructed with a plural number of diaphragm blades 453 held between a diaphragm opening and closing ring 451 and a diaphragm supporting ring 452, as it is generally known. The diaphragm block 418 is further constructed with a diaphragm driving dowel 453a, set at one side of the diaphragm blade 453, which is put into a diaphragm opening and closing cam groove (not shown in the drawings) formed on the diaphragm opening and closing ring 451. The diaphragm block 418 is further constructed with a diaphragm dowel 453b, set at the other side of the diaphragm blade, 453 which is put into a supporting hole 452a in the diaphragm supporting ring 452. The diaphragm supporting ring 452 is fixed on a stationary lens barrel 412 and the diaphragm opening and closing ring 451 is free to rotate. The diaphragm opening and closing ring 451 has a diaphragm driving rod 455, which extends in a direction parallel with the optical axis. The diaphragm driving rod 455 is driven for movement with a diaphragm driving arm 456. The diaphragm driving arm 456 is axially mounted by a shaft 457 on the stationary lens barrel 412, with the driven part 456a, at the rear end thereof, being held against the rear part of the connecting mount 411, and with the interconnecting pin at the front end part thereof engaging the diaphragm driving rod 455. The shaft 457 is provided on the supporting plate 59, which is fixed on the stationary lens barrel 412 with a fixing screw 458. The driven part 456a is moved for rotation by a predetermined angle, for example, by means of a diaphragm driving member. As a result of the operation, the aperture of the diaphragm, which is formed by the diaphragm blades 45, is enlarged or reduced.

In the lens barrel 410, constructed in the manner described above in the eighth example of a preferred embodiment, for use with an interchangeable lens, the inner gear 423, which, being set in the calibrated distance scale ring 414, is a large gear in operation centering around the optical axis, is coated with a small amount of lubricating oil. The lubricating oil is liable to stick to the clutch gear 430, which is in constant meshing with the inner gear 423. Therefore, if the clutch gear 430 rotates at a high speed, the lubricating oil will be scattered around in the proximity of the gear 430. The diaphragm block 418 is located in a position in the proximity of the clutch gear 430 and comes to a point closest to the clutch gear 430 when the diaphragm block 418 is in a position for infinite distance photography, in which the rear group lens L2 (namely, the moving lens barrel 16) moves to its farthest rearward position. If oil is scattered to the diaphragm block 418 and sticks, for example, to the diaphragm blades 453, the operation of the diaphragm blades will be deteriorated by the viscosity of the oil. The oil thus sticking to the diaphragms will glimmer, causing a reflection on the inside surface of the lens. Moveover, if the oil sticks to the surface of the lenses forming the rear group lens L2, the oil will cause a deterioration in the image-forming performance of the lens and similarly cause a reflection on the inside surface of the lens.

Therefore, a oil scatter preventing cover 447 is provided on the clutch gear which is in constant engagement with the inner gear 423 in the eighth example of a preferred embodiment, as described above, so that a scatter of oil to the optical axis side can be prevented thereby. The oil scatter preventing cover 447 is fixed with a fixing screw 446 on the bearing plate 431 rigidly mounted in the stationary lens barrel. The oil scatter preventing cover 447 is provided with a circular covering part 447a, which covers up the clutch gear 430 along the outer shape thereof and a releasing part 447c having an inserting groove 447b for the changeover shaft 428. The oil scatter preventing cover 447 directs the circular covering part 447a towards the side of the optical axis O (i.e., toward the side of the diaphragm block 418) and directs the releasing part 447c outward in the direction of the diameter.

Therefore, this oil scatter preventing cover 447, provided in this manner and formed in this construction, can eliminate the threat that the lubricating oil, which is liable to be scattered around by the rotation of the clutch gear 430 at a high speed, may stick to the diaphragm block 418 or the lenses forming the rear group lens L2.

Moreover, the rotation of the clutch gear 430, at a high speed, occurs in the AF state, in which the clutch teeth 429a and the clutch teeth 430a are in mutual engagement, with the AF-MF changeover ring 413 being positioned at the end for forward movement, as shown in FIG. 45. At this moment, rotating motion is given to the joint gear 425 by way of the joint shaft in the camera body. The rotation of the joint gear 425 is transmitted further to the clutch gear 430 via the gear train mechanism mentioned above and then transmitted from the inner gear 423 farther to the calibrated distance scale ring 414, the leading ring 15, and the moving lens barrel 416.

In contrast to this, the AF-MF changeover ring 413, as moved to a rearward area, causes the thrusting projection 413a to push the thrust projection 438b, which pushes the changeover shaft 428 and the clutch gear 429 backward by means of the engaging part 438c, upon operation releasing the clutch teeth 429a and the clutch teeth 430a from engagement with each other. At the same time, the AF-MF changeover ring 413 is put into engagement by an engaging mechanism (not shown) in the drawings with the calibrated distance scale ring 414, so that they rotate in one unified body. Therefore, an MF operation is performed by rotating the AF-MF changeover ring 413.

Although an AF lens is shown as an interchangeable lens having a gear train mechanism in the eighth example of a preferred embodiment, as described above, the present invention can be applied to a PZ lens in the same effective manner. In specific terms, an oil scatter preventing cover is to be provided similarly to at least one part of the gears forming the driving mechanism, in case a variable magnification lens group is to be driven with a gear train. Also in this case, it is most effective to install an oil scatter preventing cover on the small gear, which works in constant mesh with the lens driving gear, rotating around the optical axis as the center of its rotation.

As described hereinabove, the lens barrel described in the eighth example of a preferred embodiment of the present invention offers a construction in which an oil scatter preventing cover, which covers up at least the outer periphery of the gear at the side of the optical axis, is provided on at least one of the gears, not having the optical axis as the center of rotation, and arranged in the peripheral area of the lens barrel, and is therefore capable of preventing the threat of the lubricating oil sticking to the gear being scattered about at the side of the optical axis, and thereby soiling the component parts. The diaphragm and the lens in an electrically driven lens having a gear train mechanism for moving a composite lens group in the direction of the optical axis may be soiled.

The present disclosure relates to subject matters contained in Japanese patent Applications No. HEI 3-218139 filed on May 21, 1991, HEI 3-218142 filed on May 21, 1991, HEI 3-218143 filed on May 21, 1991, HEI 3-218144 filed on May 21, 1991, HEI 3-337497 filed on Oct. 22, 1991, HEI 4-275424 filed on Apr. 27, 1992, and HEI 4-27525 filed on Apr. 27, 1992, which are expressly incorporated herein by reference in their entireties.

What is claimed is:

1. A lens barrel for an automatic focusing camera, wherein said lens barrel comprising:
   an annular focusing member for moving a focusing lens in a direction of an optical axis by rotating said annular focusing member about the optical axis;
   an automatic focusing means for rotating said annular focusing member by a driving force applied by a motor;
   an annular changeover member arranged so as to be manually rotatable about the optical axis, and arranged so as to be manually movable in the direction of the optical axis between an AF mode setting position and an MF mode setting position;
   a first clutch means for releasing a connection between said annular changeover member and said annular focusing member to permit independent rotation thereof, when said annular changeover member is in said AF mode setting position and for forming said connection therebetween to thereby form a rotationally dependent structure, when said annular changeover member is in said MF mode setting position; and a second clutch means for forming a connection between said focusing means and said annular focusing member, when said annular changeover member is in said AF mode setting position, and for releasing the connection, when said annular changeover member is in said MF mode setting position.

2. The lens barrel according to claim 1, which further comprises:

locking means for locking said annular changeover member in the rotating direction when said annular changeover member is in said AF mode setting position, and for releasing the lock thereof when said annular changeover member is in said MF mode setting position.

3. The lens barrel according to claim 1, wherein said first clutch means includes:

at least one clutch pin supported on one of said annular changeover member and said annular focusing member;

a disengaging portion formed on the other of said annular changeover member and said annular focusing member for disengagement thereof from said clutch pin, when said annular changeover member is in said AF mode setting position; and an engaging portion formed on the other of said annular changeover member and the annular focusing member for engagement thereof with said clutch pin, when said annular changeover member is in said MF mode setting position, to unify the annular changeover member with said annular focusing member for movement in the rotating direction.

4. The lens barrel according to claim 3, wherein said clutch pin is supported on said annular focusing member; and said disengaging portion and said engaging portion are formed on said annular changeover member.

5. The lens barrel according to claim 1, wherein said first clutch means comprises:

at least one click ball supported on one of said annular changeover member and said annular focusing member; and at least one clicking groove formed on the other of said annular changeover member and said annular focusing member, for engagement thereof with said click ball when said annular changeover member is in said MF mode setting position, to form a structure integrating the annular changeover member with said annular focusing member for unified movement in the rotating direction.

6. The lens barrel according to claim 5, wherein said click ball is supported on said annular focusing member; and said click groove is formed on said annular changeover member.

7. The lens barrel according to claim 1, wherein said first clutch means comprises:

a locking pinion rotatably supported on one of said annular changeover member and said annular focusing member;

a rack-shaped peripheral groove portion formed on the other of said annular changeover member and said annular focusing member, with a predetermined clearance formed between the rack-shaped peripheral groove portion and said locking pinion when said annular changeover member is put in said AF mode setting position; and a rack-shaped lock groove portion formed on the other of said annular changeover member and said annular focusing member, on which said locking pinion strands when said annular changeover member is in said MF mode setting position, thereby setting the locking pinion for its frictional engagement of said annular changeover member with said annular focusing member for unified movement in the rotating direction.

8. The lens barrel according to claim 7, wherein said locking pinion is rotatably supported on said annular changeover member; and said rack-shaped peripheral groove portion and rack-shaped lock groove portion are formed on said annular focusing member.

9. The lens barrel according to claim 1, wherein said first clutch means comprises:

a locking pinion rotatably supported on one of said annular changeover member and said annular focusing member;

a small-diameter cylindrical portion formed on the other of said annular changeover member and said annular focusing member, positioned in a predetermined gap between said small-diameter cylindrical portion and said locking pinion, when said annular changeover member is in said AF mode setting position; and a rack-shaped lock groove portion formed on the other of said annular changeover member and said annular focusing member, which said locking pinion strands when said annular changeover member is in said MF mode setting position, thereby putting the locking pinion in a frictional engagement to form a unified structure of said annular changeover member with said annular focusing member for movement in the rotating direction.

10. The lens barrel according to claim 9, wherein said locking pinion is rotatably supported on said annular changeover member; and said small-diameter cylindrical portion and rack-shaped lock groove portion are formed on said annular focusing member.

11. The lens barrel according to claim 1, wherein said first clutch means comprises:

at least one clutch pin supported on one of said annular changeover member and said annular focusing member;

a small-diameter cylindrical portion formed on the other of said annular changeover member and said annular focusing member for contact with said clutch pin for putting said clutch pin into low-frictional engagement or for putting said clutch pin out of engagement with said annular focusing member when said annular changeover member is in said AF mode setting portion; and a large-diameter cylindrical portion formed on the other of said annular changeover member and said annular focusing member, for high frictional contact with said clutch pin for engagement thereof with said annular focusing member, when said annular changeover member is in said MF mode setting position, to form a structure integrating said annular changeover member with said annular focusing member for movement in the rotating direction.

12. The lens barrel according to claim 11, wherein said clutch pin is supported on said annular changeover member; and said small-diameter cylindrical portion and large-diameter cylindrical portion are formed on said annular focusing member.

13. The lens barrel according to claim 12, wherein
said annular changeover member includes at least one through hole extending in a radial direction of said annular changeover member; and said clutch pin is inserted into said through hole to be movable in the radial direction of said annular changeover member.

14. The lens barrel according to claim 13, wherein
said first clutch means further includes an urging member for urging said clutch pin to extend toward said annular focusing member; and said large-diameter cylindrical portion contacts with said clutch pin against the urging force of said urging member.

15. The lens barrel according to claim 1, wherein said second clutch means comprises:

a clutch gear, rotatable in correspondence with the rotation of said annular focusing member in the rotating direction, and movable in the direction of the optical axis in correspondence with the movement of said annular changeover member between said AF mode setting position and MF mode setting position; and an AF gear rotated by said motor, intermeshed with said clutch gear when said annular changeover member is in said AF mode setting position and disengaged from said clutch gear when said annular changeover member is in said MF mode setting position.

16. The lens barrel according to claim 15, which further comprises:

detecting means for detecting whether or not said AF mode or MF mode is being set up.

17. The lens barrel according to claim 16, wherein said detecting means detects said AF mode or said MF mode in accordance with said AF mode setting position or said MF mode setting position of the annular changeover member, independently of actuation of said clutch gear.

18. The lens barrel according to claim 1, wherein said annular focusing member includes a central gear formed to be coaxial with the optical axis.

19. The lens barrel according to claim 18, wherein said first clutch means comprises:

a driven clutch gear intermeshed with said central gear of said annular focusing member;

a driving clutch gear rotated by said motor and movable in the direction of the optical axis for engagement with said driven clutch gear; and a switch shaft coupled to said driving clutch gear at least in the optical axis direction, and intermeshing said driving clutch gear with said driving clutch gear to be rotated synchronously when said annular changeover member is in said AF mode setting position.

20. The lens barrel according to claim 1, wherein said automatic focusing means includes a gear train for transmitting the rotational force from said motor to said annular focusing member.

21. The lens barrel according to claim 20, which further comprises:

an oil scatter preventing cover, provided on a gear which constitutes said gear train, and which is disposed so as to be out of the optical axis, for covering at least an outer periphery of said gear relative to the optical axis to prevent scattering of oil applied to the gear train.

22. The lens barrel according to claim 21, wherein said gear covered with said oil scatter preventing cover is intermeshed with a central gear which is rotated about the optical axis and provided for driving said focusing lens.

23. A lens barrel of an automatic focusing camera, said lens barrel comprising:

an annular focusing member for moving a focusing lens in a direction of an optical axis upon rotation of said annular focusing member about the optical axis;

automatic focusing means for rotating said annular focusing member by a driving force of a motor;

an annular changeover member arranged so as to be manually rotatable about the optical axis and arranged so as to be manually moveable in the direction of the optical axis between an AF mode setting position and an MF mode setting position;

an interlocking gear rotated in unified motion with the rotation of said annular focusing member;

a first clutch means for releasing a connection between said annular changeover member and said annular focusing member to permit independent rotation thereof when said annular changeover member is in said AF mode setting position, and for forming a connection therebetween to thereby form a rotationally dependent structure when said annular changeover member is in said MF mode setting position; and a second clutch means for forming a connection between said automatic focusing means and said interlocking gear when said annular changeover member is in said AF mode setting position and for releasing the connection therebetween when said annular changeover member is in said AF mode setting position.

24. The lens barrel according to claim 23, which further comprises:

lock means for locking said annular changeover member in the rotating direction when said annular changeover member is in said AF mode setting position and for releasing the locking thereof when said annular changeover member is in said MF mode setting position.

25. The lens barrel according to claim 24, wherein said automatic focusing means includes a drive shaft rotated by said motor and an engaging portion formed on said drive shaft, and said engaging portion is engaged with said interlocking gear to form a structure integrating each other in the rotating direction, when said annular changeover member is in said AF mode setting position and is disengaged from said interlocking gear to be disconnected therefrom when said annular changeover member is in said MF mode setting position.

26. The lens barrel according to claim 25, wherein said interlocking gear and said drive shaft are positioned coaxial with each other.

27. The lens barrel according to claim 26, wherein said interlocking gear is fitted with said drive shaft so as to be slidable in the direction of said drive shaft.

* * * * *